(12) United States Patent
Takeuchi et al.

(10) Patent No.: US 7,580,634 B2
(45) Date of Patent: Aug. 25, 2009

(54) TRANSMISSION METHOD, TRANSMITTER-RECEIVER, AND TRANSMITTING-RECEIVING SYSTEM

(75) Inventors: Takeshi Takeuchi, Tokyo (JP); Akio Tajima, Tokyo (JP); Shigekazu Harada, Tokyo (JP); Akihiro Tanaka, Tokyo (JP); Wakako Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 828 days.

(21) Appl. No.: 10/971,047

(22) Filed: Oct. 25, 2004

(65) Prior Publication Data

US 2005/0111843 A1    May 26, 2005

(30) Foreign Application Priority Data

Oct. 28, 2003    (JP)    ............... 2003-367880

(51) Int. Cl.
H04B 10/08    (2006.01)
(52) U.S. Cl. ............... 398/38; 398/15; 398/162
(58) Field of Classification Search .......... 398/15, 398/38, 162
See application file for complete search history.

(56) References Cited

U.S. PATENT DOCUMENTS

| | | | | |
|---|---|---|---|---|
| 5,808,760 | A * | 9/1998 | Gfeller | 398/27 |
| 6,304,347 | B1 * | 10/2001 | Beine et al. | 398/38 |
| 7,215,883 | B1 * | 5/2007 | Lewis | 398/25 |
| 2003/0053165 | A1 * | 3/2003 | Nagayama et al. | 359/110 |

FOREIGN PATENT DOCUMENTS

| | | |
|---|---|---|
| CN | 1227034 A | 8/1999 |
| JP | 4-252541 A | 9/1992 |
| JP | 6-69884 A | 3/1994 |
| JP | 6-77962 A | 3/1994 |
| JP | 9-93199 A | 4/1997 |
| JP | 9-508249 A | 8/1997 |
| JP | 11-18086 A | 1/1999 |
| JP | 11-183324 A | 7/1999 |
| JP | 2000-68938 A | 3/2000 |
| JP | 2002-111120 A | 4/2002 |
| JP | 2002-368693 A | 12/2002 |
| JP | 2003-32189 A | 1/2003 |
| WO | WO 02/03564 A1 | 1/2002 |

* cited by examiner

Primary Examiner—Christina Y Leung
(74) Attorney, Agent, or Firm—Sughrue Mion, PLLC

(57) ABSTRACT

A transmitter-receiver having a means for automatically determining the status of transmission medium such as optical fiber, and a means for automatically setting and resetting the transmission rate and/or output power according to the status of the transmission medium, a transmission loss and gain measurement method, and a transmitting-receiving system. A transmitter-receiver comprises at least: an output power controller for controlling the output power of a transmitter; an input power measuring section for measuring the strength of input signals; and an information processor for deriving the loss or gain of a path to change the output power of the transmitter and/or the rate of data transmission according to the derived loss or gain of the path. A transmission loss and gain measurement method applied to a system comprising transmission media and a plurality of the transmitter-receivers connected via the transmission media, comprises the steps of: transmitting information on the output power of a first transmitter-receiver from the first transmitter-receiver to a second transmitter-receiver; measuring reception strength by the second transmitter-receiver when the second transmitter-receiver receives the output power information; reading the output power information by the second transmitter-receiver; and comparing the reception strength with the output power information to calculate a transmission loss or gain by the second transmitter-receiver.

65 Claims, 14 Drawing Sheets

FIG. 7
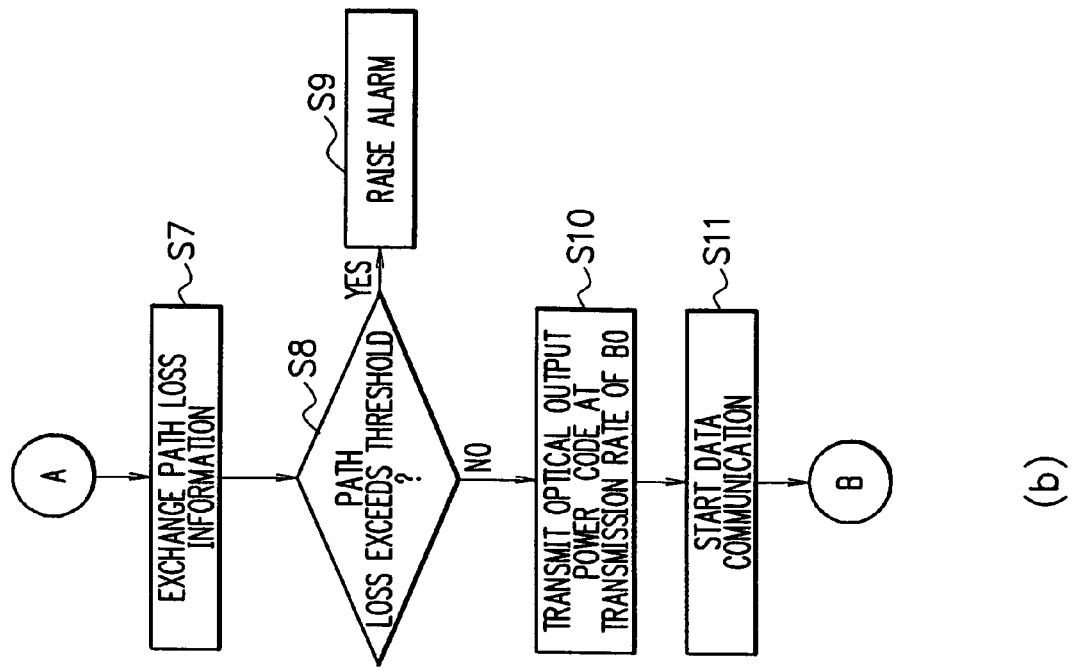
(a)
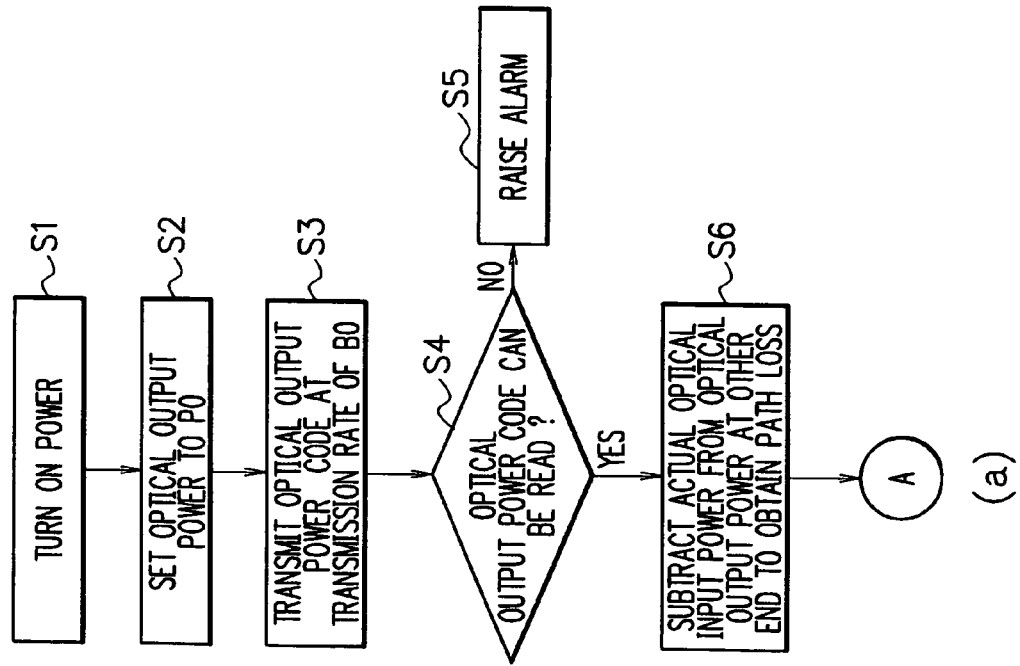
(b)

| | CODE | AVERAGE OPTICAL OUTPUT POWER |
|---|---|---|
| CODE A | 0011 | −6dBm |
| CODE B | 0101 | −3dBm |
| CODE C | 0110 | 0dBm |
| CODE D | 1001 | 3dBm |

F I G. 13
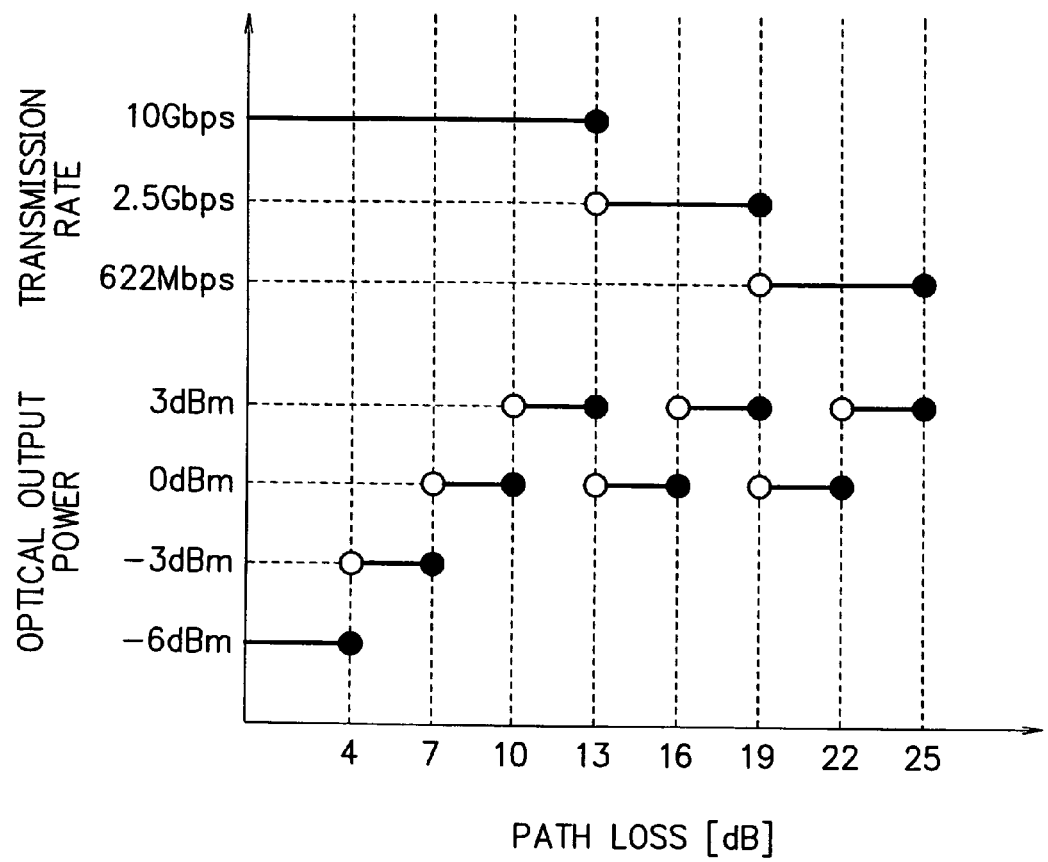

F I G. 14
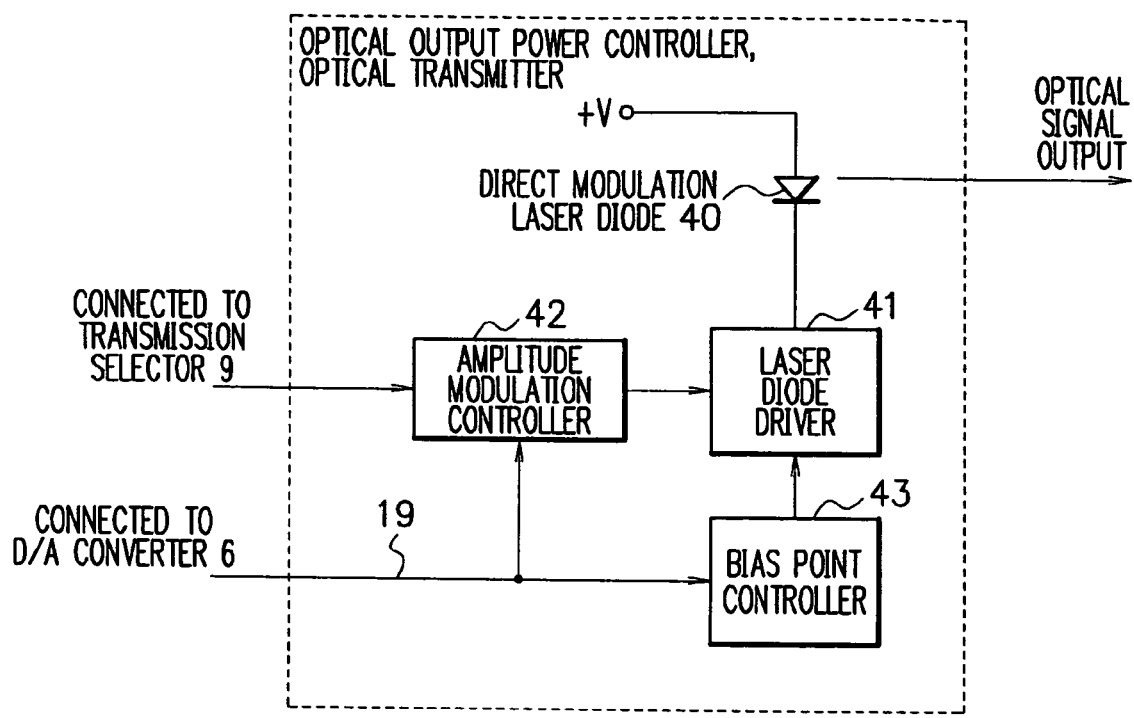

F I G. 15
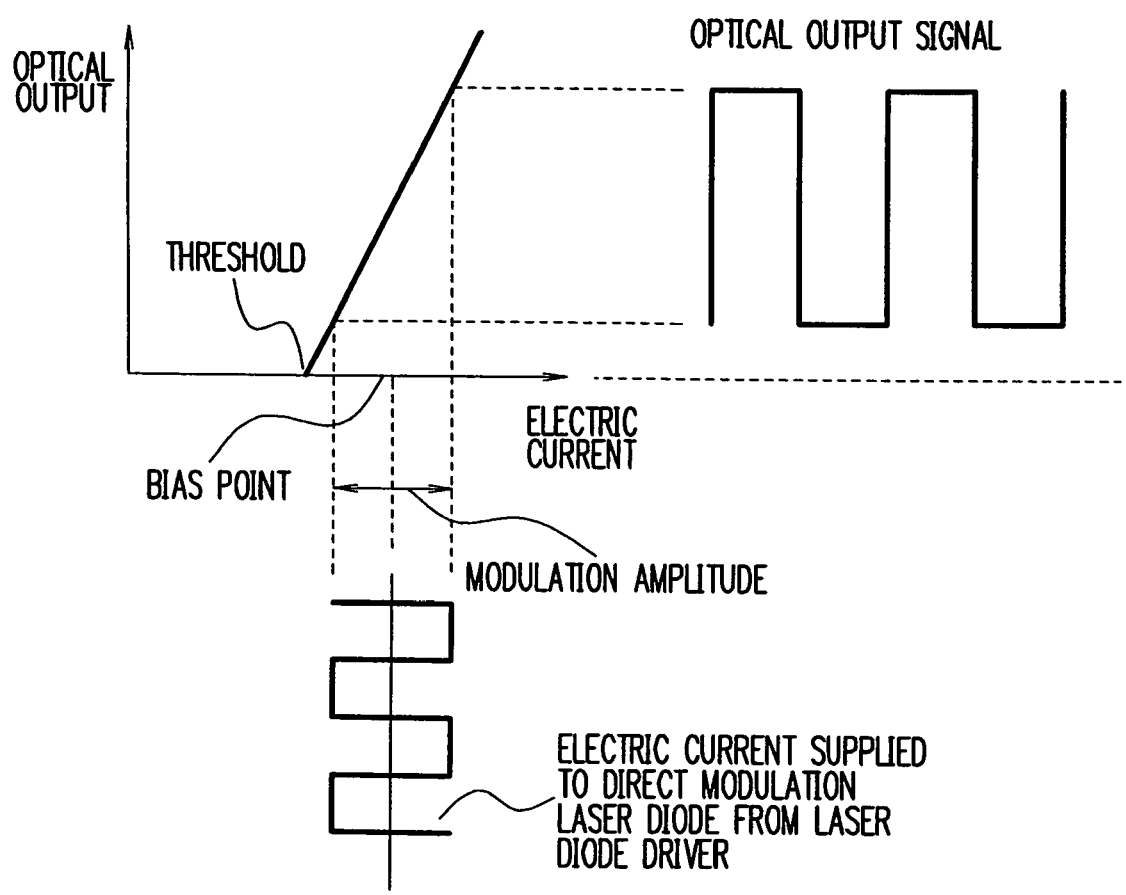

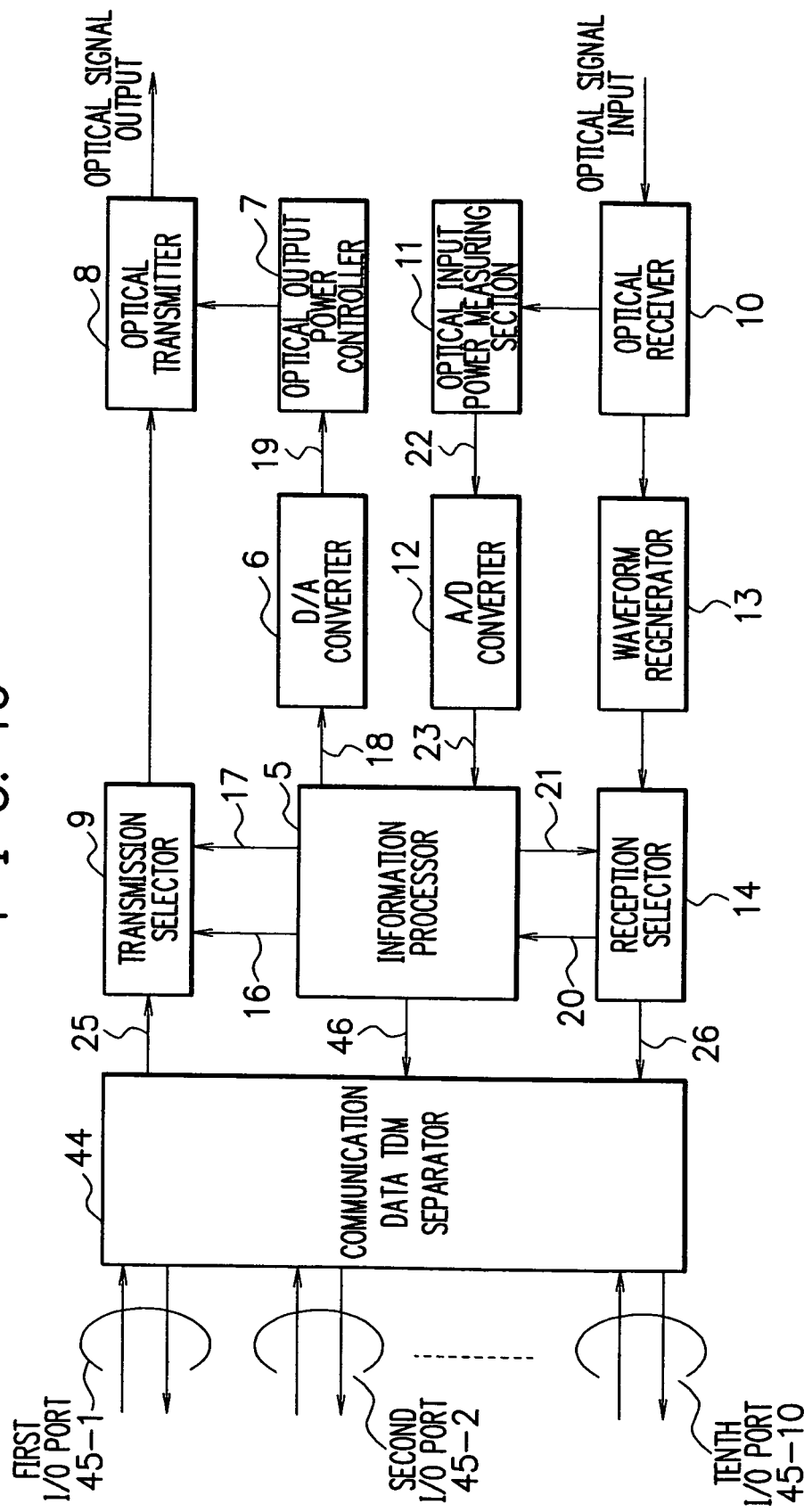
F I G. 16

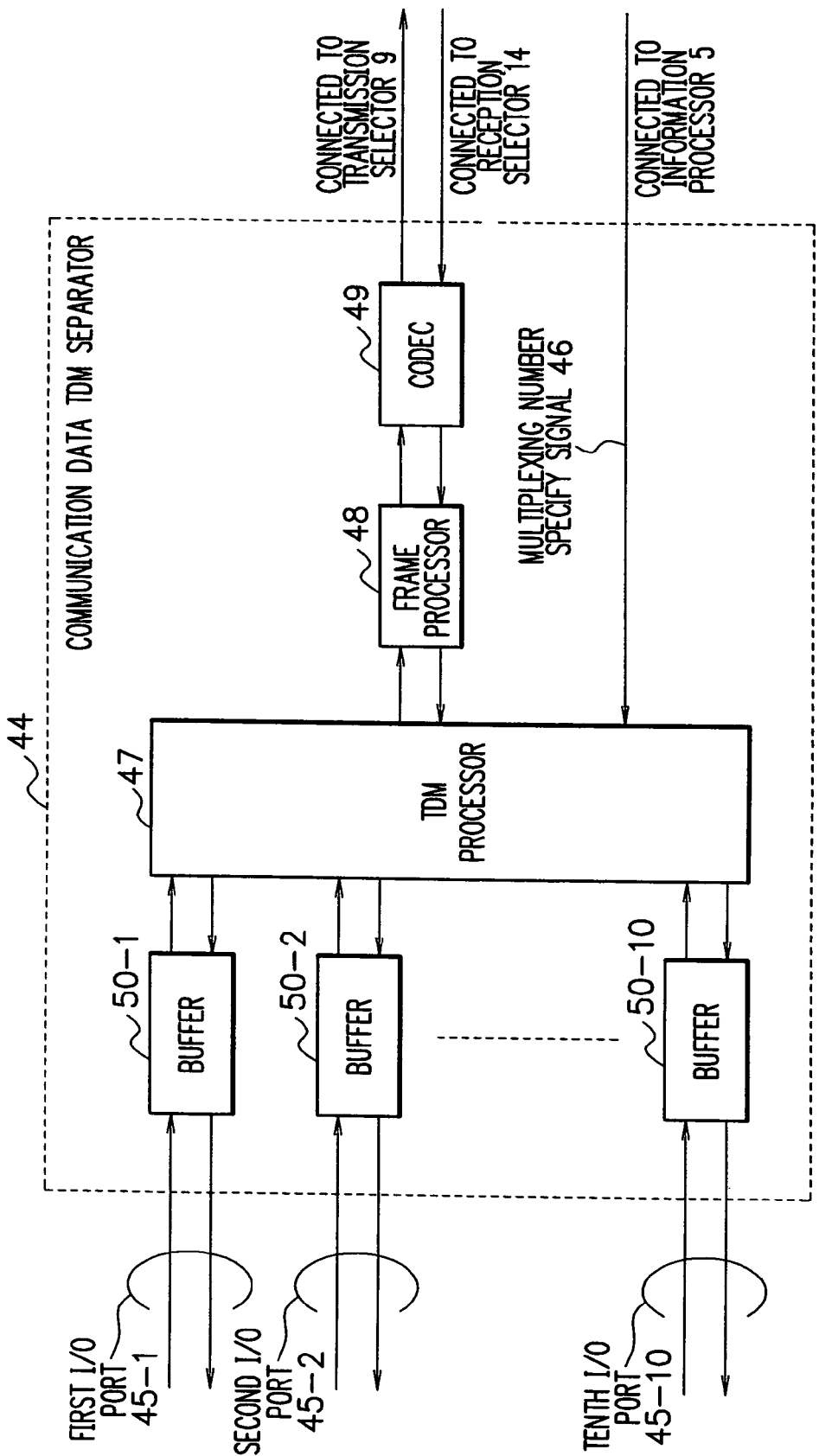

TRANSMISSION METHOD, TRANSMITTER-RECEIVER, AND TRANSMITTING-RECEIVING SYSTEM

FIELD OF THE INVENTION

The present invention relates to a transmitter-receiver for communication, and more particularly, to a transmitter-receiver having a means for determining the status of a channel so as to be capable of selecting and changing the transmission rate and output power for transmission/reception according to the status of the channel, a transmission loss and gain measurement method, and a transmitting-receiving system.

BACKGROUND OF THE INVENTION

In general, data is transmitted and received between two opposed transmitter-receivers via transmission media. FIG. 1 is a diagram showing an example of optical transmitter-receivers that transmit and receive optical signals through optical fibers as transmission media. In FIG. 1, optical transmitter-receivers 101 and 102 are connected via optical fibers 103 and 104 with each other. Electrical signals output from or input to the optical transmitter-receivers 101 and 102 are sent to or from other equipment such as telecommunication equipment and electronic information processing equipment (not shown). The optical transmitter-receiver 101 (102) converts an electrical signal fed from other equipment to an optical signal and transmits the optical signal to the optical transmitter-receiver 102 (101), or converts an optical signal received from the transmitter-receiver 102 (101) to an electrical signal to send other equipment the electrical signal.

With regard to the data rate or transmission rate, data format and the like, various standards have been defined in order to facilitate the interconnection between transmitter-receivers. As an example of such standards may be cited the IEEE 802.3ae 10GBASE-LR standard defined by an international standards association, IEEE SA (Institute of Electrical and Electronics Engineers Standard Association). The standards specify, for example, the data rate (10.3125 Gbps on optical fiber), wavelength of light, data format, and transmission distance.

As a conventional technique for surely conducting optical communication, Japanese Patent Application laid open No. 2000-68938 has disclosed "Optical Transmitter-Receiver". The optical transmitter-receiver at the transmitting end sends a signal to a channel and learns the status of optical fiber by monitoring the return signal. The information is fed back to the intensity of a laser beam.

The conventional optical transmitter-receiver, however, has some problems. First, the transmitter-receiver does not have a function for automatically setting the transmission rate according to the status of a channel or the like. Consequently, it is required to set the transmission rate manually according to the status of a channel including the loss of optical fiber measured with an additional measuring instrument. Besides, in the case where the transmission rate is fixed and cannot be changed, the transmitter-receiver itself has to be replaced with another model.

In the following, a description will be made of problems caused by the fixed transmission rate by taking an optical transmitter-receiver based on the aforementioned 10GBASE-LR standard as an example. Generally, in digital signal communications, data can be transmitted and received with lower power as the transmission rate decreases. For that reason, if there is a considerable loss in a transmission medium such as optical fiber, it is possible to transmit and receive data. In the case of a 10GBASE-LR standard-based optical transmitter-receiver, however, the transmission rate is fixed at 10.3125 Gbps. Therefore, when the transmission loss is increased to a certain value, the optical transmitter-receiver is disabled for communication. In other words, even when data can be communicated by reducing the transmission rate, the optical transmitter-receiver cannot adjust a transmission rate setting because of the fixed transmission rate.

Second, the conventional transmitter-receiver does not have a function for automatically setting output power according to the status of a channel or the like. As in the case of the transmission rate described above, it is required to set output power manually according to the status of a channel including the loss of optical fiber measured with an additional measuring instrument. In the case where output power is fixed and cannot be changed, the transmitter-receiver itself or the interface thereof has to be replaced with another model.

Third, the conventional transmitter-receiver does not have a means for determining the status of a transmission medium such as the loss of optical fiber. Therefore, as described above, it is required to determine the status of a channel including the loss of optical fiber with an additional measuring instrument prior to connecting transmitter-receivers. For this reason, the renewal of the transmitter-receiver requires a considerable time, and also it is difficult to modify system configuration.

SUMMARY OF THE INVENTION

It is therefore an object of the present invention to provide a transmitter-receiver having a means for automatically determining the status of transmission media such as optical fibers, and a means for automatically setting and resetting the transmission rate and/or output power according to the status of the transmission medium.

In accordance with the first aspect of the present invention, to achieve the object mentioned above, there is provided a transmission loss and gain measurement method applied to a system comprising transmission media and a plurality of transmitter-receivers connected via the transmission media, comprising the steps of transmitting information on the output power of a first transmitter-receiver from the first transmitter-receiver to a second transmitter-receiver; measuring reception strength or intensity by the second transmitter-receiver when the second transmitter-receiver receives the output power information; reading the output power information by the second transmitter-receiver; and comparing the reception strength with the output power information to calculate a transmission loss or gain by the second transmitter-receiver.

The transmission loss and gain measurement method may be an optical transmission loss and gain measurement method.

The step of measuring reception strength may include the step of measuring the average photocurrent or photoelectric current that flows through a light receiving element for receiving the output power information.

The output power information may be represented by a digital code.

The digital code may be a binary code having a constant mark ratio.

A string of bits indicating the head of the digital code may be added to the beginning of the digital code.

A string of bits indicating that the digital code represents the output power information may be added to the digital code.

A string of bits for detecting a code error may be added to the digital code.

The output power information may include different types of information on output power, and at the step of calculating a transmission loss or gain, the transmission loss or gain may be calculated by statistically processing transmission losses or gains calculated based on the different types of output power information, respectively.

In accordance with the second aspect of the present invention, there is provided a transmitter-receiver performing the steps involved in the transmission loss and gain measurement method described above.

In accordance with the third aspect of the present invention, there is provided a transmitter-receiver connected via transmission media with at least one transmitter-receiver for transmitting and receiving data, comprising: a first measuring unit for measuring the transmission loss or gain of the transmission media; a resetting unit for changing the transmission rate and/or the output power according to a measurement result obtained by the first measuring unit; an informing unit for sending another transmitter-receiver information on its own output power; a second measuring unit for measuring reception strength or intensity on receipt of output power information from another transmitter-receiver; a reading unit for reading the output power information; and a third measuring unit for measuring a transmission loss or gain based on the reception strength and the output power information.

The transmission media may be optical transmission media through which the light is transmitted.

The transmitter-receiver may further comprise an output power controlling unit for controlling output power for transmitting the output power information so that the output power is not to exceed the maximum permissible input power of another transmitter-receiver at the receiving end.

A code error rate theoretically or actually obtained from the transmission rate and the output power for transmitting the output power information may be set to be equal to or lower than a code error rate theoretically or actually obtained when a signal is transmitted or received at the lowest transmission rate and with the highest output power selectable for data communication.

The output power for transmitting the output power information may be expressed as follows:

$$P0 \geq P1 \times (B0/B1)$$

where B0 and P0 are the transmission rate and the output power for transmitting the output power information, respectively, and B1 and P1 are the lowest transmission rate and the highest output power selectable for data communication, respectively.

The transmission rate for transmitting the output power information may be set to be equal to or lower than the lowest transmission rate selectable for data communication.

The transmitter-receiver may send information on the transmission loss or gain of the transmission media to another transmitter-receiver at the receiving end after measuring the transmission loss or gain.

In accordance with the fourth aspect of the present invention, there is provided a transmitter-receiver, comprising: a transmitter for transmitting signals to a transmission medium; an output power controller for controlling the output power of the transmitter; a receiver for receiving signals via a transmission medium; an input power measuring section for measuring the strength of input signals; a communication data processor for changing the rate of data transmission; and an information processor for deriving the loss or gain of a path, and outputting a signal to change the output power of the transmitter and/or the rate of data transmission according to the derived loss or gain of the path.

The transmitter may include: a laser diode for radiating laser beams; an optical modulator for modulating the laser beams; and an optical modulator driver for driving the optical modulator.

The output power controller may include a direct current generator for controlling the value of electric current.

The transmitter and the output power controller may include: a direct modulation laser diode for outputting direct optical signals; a laser diode driver for driving the direct modulation laser diode; a bias point controller for controlling the bias point of the laser diode driver; and an amplitude modulation controller for controlling the amplitude modulation of the laser diode driver.

The receiver may include a light receiving element.

The input power measuring section may include a direct current meter for measuring the average photocurrent or photoelectric current that flows through the light receiving element.

The communication data processor may further include a unit for detecting the code error of communicated frame data, and the data transmission rate may be changed according to the presence or absence of the code error of the frame data and the size of the code error.

The communication data processor may further include: a clock generator for generating a clock signal to be a reference for the rate of signal processing; a divider for dividing the clock signal from the clock generator at a designated dividing rate; and a frame processor for detecting the code error of input frame data.

The communication data processor may further include a unit for changing the dividing rate according to the presence or absence of the code error of the frame data and the size of the code error detected by the frame processor.

The communication data processor may further include: a plurality of data input-output ports (I/O ports); a unit for multiplexing data in the data I/O ports to transmit the data; a unit for demultiplexing input data to output the data to the I/O ports; a unit for increasing or decreasing the number of multiplexing when data in the data I/O ports are multiplexed.

When data in the data I/O ports are multiplexed, the number of multiplexing may be increased or decreased according to the presence or absence of the code error of the frame data and the size of the code error.

In accordance with the fifth aspect of the present invention, there is provided a transmitting-receiving system comprising transmission media and a plurality of transmitter-receivers connected via the transmission media, wherein the transmitter-receiver comprises: a transmitter for transmitting signals and information on its own output power to one of the transmission media; an output power controller for controlling the output power of the transmitter; a receiver for receiving signals and information on output power via one of the transmission media; an input power measuring section for measuring the strength of input signals; a communication data processor for changing the rate of data transmission; and an information processor for deriving a path loss based on the output power information and the signal strength, and changing the output power of the transmitter and the rate of data transmission according to the derived path loss.

As set forth hereinabove, in accordance with the present invention, to achieve the object mentioned above, a transmitter-receiver comprises: a transmitter for transmitting signals to a transmission medium; an output power controller for controlling the output power of the transmitter; a receiver for receiving signals via a transmission medium; an input power measuring section for measuring the power of input signals; a communication data processor for changing the rate of data transmission; and an information processor for deriving the loss or gain of a path, and selecting the output power of the transmitter and/or the rate of data transmission according to the derived loss or gain of the path.

Further, a method of measuring the transmission loss and gain of transmission media for the transmitter-receiver of the present invention, which is applied to a transmitting-receiving system comprising transmission media and a plurality of transmitter-receivers connected via the transmission media, comprises the steps of: transmitting information on the output power of a first transmitter-receiver from the first transmitter-receiver to a second transmitter-receiver; measuring reception strength or intensity by the second transmitter-receiver when the second transmitter-receiver receives the output power information; reading the output power information by the second transmitter-receiver; and comparing the reception strength with the output power information to calculate a transmission loss or gain by the second transmitter-receiver.

BRIEF DESCRIPTION OF THE DRAWINGS

The objects and features of the present invention will become more apparent from the consideration of the following detailed description taken in conjunction with the accompanying drawings in which:

FIG. 7 is a flowchart showing the operation of the transmitter-receiver depicted in FIG. 2;

FIG. 13 is a chart for explaining the operation of the transmitter-receiver depicted in FIG. 2;

FIG. 14 is a block diagram showing the construction of an optical transmitter and an optical output power controller of a transmitter-receiver according to the second embodiment of the present invention;

FIG. 15 is a diagram for explaining the operation of the transmitter-receiver according to the second embodiment of the present invention;

FIG. 16 is a block diagram showing the construction of a transmitter-receiver according to the third embodiment of the present invention; and FIG. 17 is a block diagram showing the construction of a communication data time division multiplex (TDM) separator of the transmitter-receiver depicted in FIG. 16.

DESCRIPTION OF THE PREFERRED EMBODIMENTS

Figure 1:
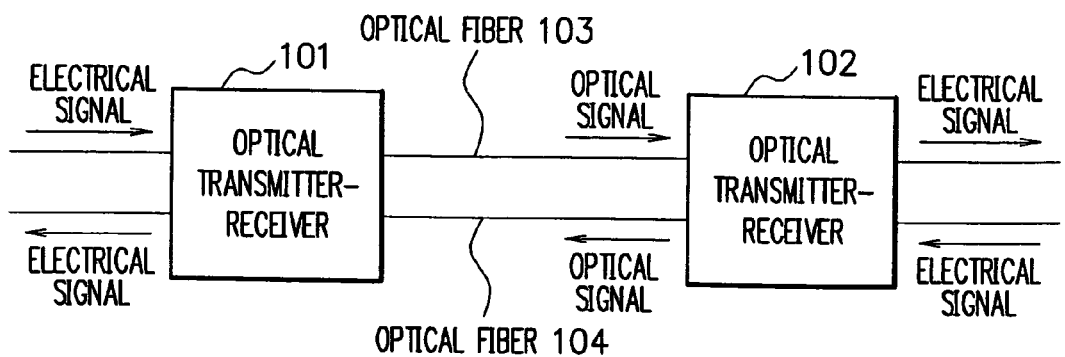
FIG. 1 is a diagram showing an example of conventional optical transmitter-receivers that hold optical communication with each other.

Referring now to the drawings, a description of preferred embodiments of the present invention will be given in detail.

Figure 2:
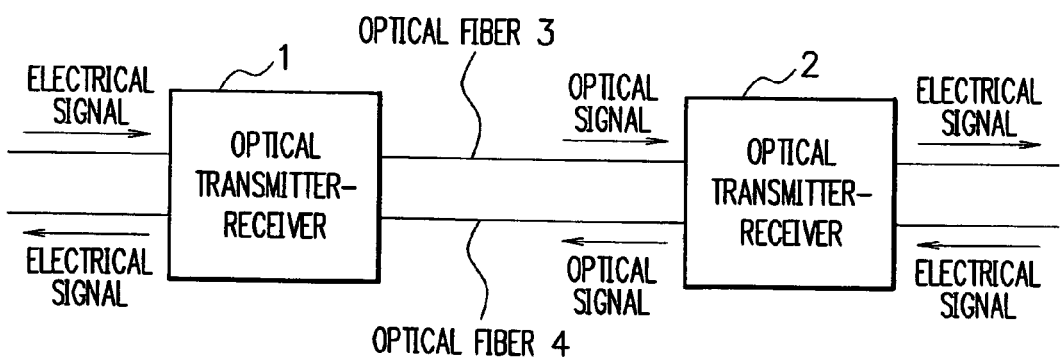
FIG. 2 is a diagram showing optical transmitter-receivers that hold optical communication with each other according to the first embodiment of the present invention.

In the following, the first embodiment of the present invention will be described. FIG. 2 is a diagram showing optical transmitter-receivers, which hold optical communication with each other, according to the first embodiment of the present invention. Referring to FIG. 2, optical transmitter-receivers 1 and 2 are connected via optical fibers 3 and 4 with each other. Electrical signals output from or input to the optical transmitter-receivers 1 and 2 are sent to or from other equipment such as telecommunication equipment and electronic information processing equipment (not shown).

Figure 3:
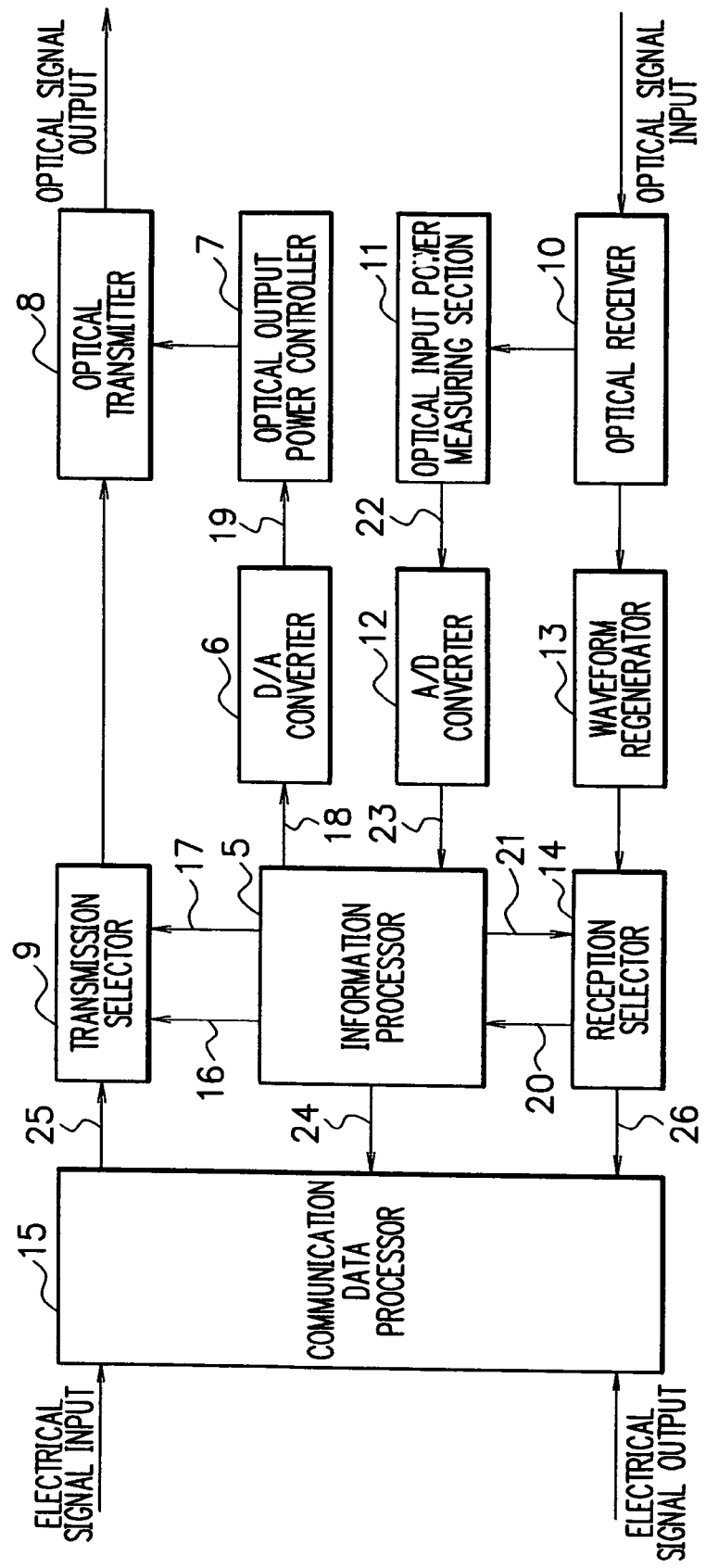
FIG. 3 is a block diagram showing the construction of the transmitter-receiver depicted in FIG. 2.

FIG. 3 is a block diagram showing the construction of the optical transmitter-receiver according to the first embodiment of the present invention. The optical transmitter-receivers 1 and 2 in FIG. 2 are of like construction and thus but one of them is shown in FIG. 3. As can be seen in FIG. 3, the optical transmitter-receiver comprises an information processor 5, a digital-analog (D/A) converter 6, an optical output power controller 7, an optical transmitter 8, a transmission selector 9, an optical receiver 10, an optical input power measuring section 11, an analog-digital (A/D) converter 12, a waveform regenerator 13, a reception selector 14, and a communication data processor 15.

The optical transmitter 8 converts an electrical signal to an optical signal to output the optical signal. The optical output power controller 7 controls the optical output power of the optical transmitter 8. The optical receiver 10 converts an input optical signal to an electrical signal. The optical input power measuring section 11 measures the strength of input signals. The waveform regenerator 13 adjusts the waveform of an electrical signal output from the optical receiver 10 so that the signal can undergo digital signal processing. The communication data processor 15 processes communicated data. The information processor 5 processes various types of information, which will be more fully described hereinafter. The D/A converter 6 converts an optical output power specify signal 18 being a digital signal output from the information processor 5 to an analog signal to feed the optical output power controller 7 with the analog signal. The A/D converter 12 converts an optical input power signal 22 being an analog signal received from the optical input power measuring section 11 to a digital signal to feed the information processor 5 with the digital signal. The transmission selector 9 selects a signal from either the information processor 5 or the communication data processor 15 to send the signal to the optical transmitter 8. The reception selector 14 selects a signal from either the information processor 5 or the waveform regenerator 13 to send the signal to the communication data processor 15.

The communication data processor 15 can select and change the transmission rate according to a transmission rate control signal 24 from the information processor 5. In the first embodiment, the transmission rate can be selected from 622 Mbps, 2.5 Gbps and 10 Gbps.

Figure 4:
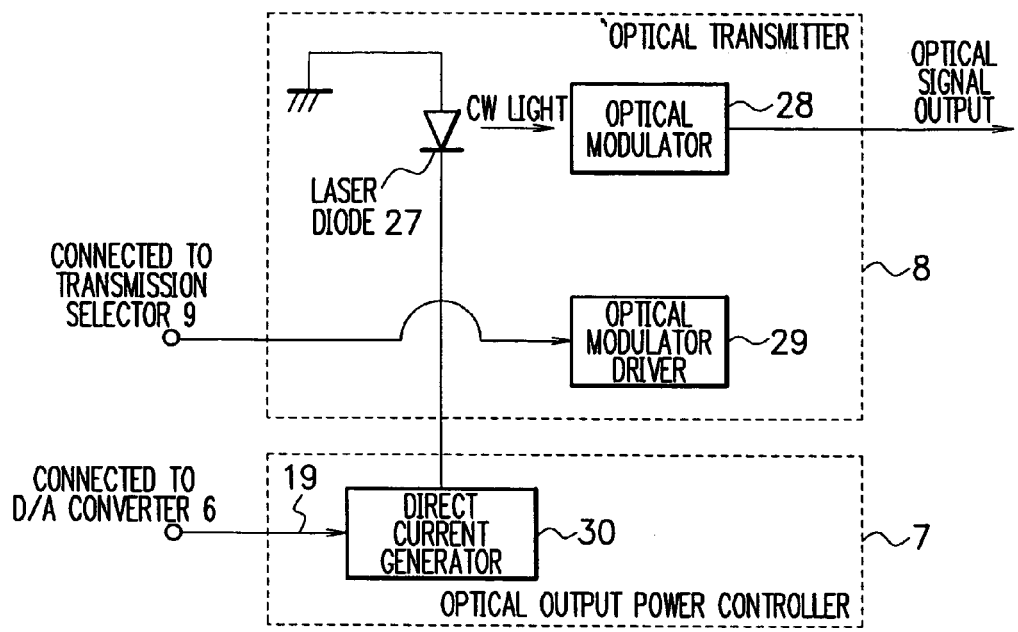
FIG. 4 is a block diagram showing the construction of an optical transmitter and an optical output power controller of the transmitter-receiver depicted in FIG. 2.

FIG. 4 is a block diagram showing the construction of the optical transmitter 8 and the optical output power controller 7. As shown in FIG. 4, the optical transmitter 8 includes a laser diode 27 for emitting continuous wave (CW) light, an optical modulator 28 for switching ON or OFF the CW light according to an input electrical signal to thereby generate an optical signal, and an optical modulator driver 29 for inputting the electrical signal to the optical modulator 28 to drive the modulator 28. The signal sent from the transmission selector 9 is fed to the optical modulator driver 29. The optical output power controller 7 includes a direct current generator 30. The output from the direct current generator 30 is fed to the laser diode 27. The direct current generator 30 is connected with the D/A converter 6, and receives an optical output power specify signal 19 that has been converted to an analog signal. Based on the optical output power specify signal 19, the direct current generator 30 controls the strength or intensity of direct current output to the laser diode 27, thus controlling the optical output power of the diode 27. The optical output power (average power) of the diode 27 can be set to −6 dBm, −3 dBm, 0 dBm or +3 dBm.

Figure 5:
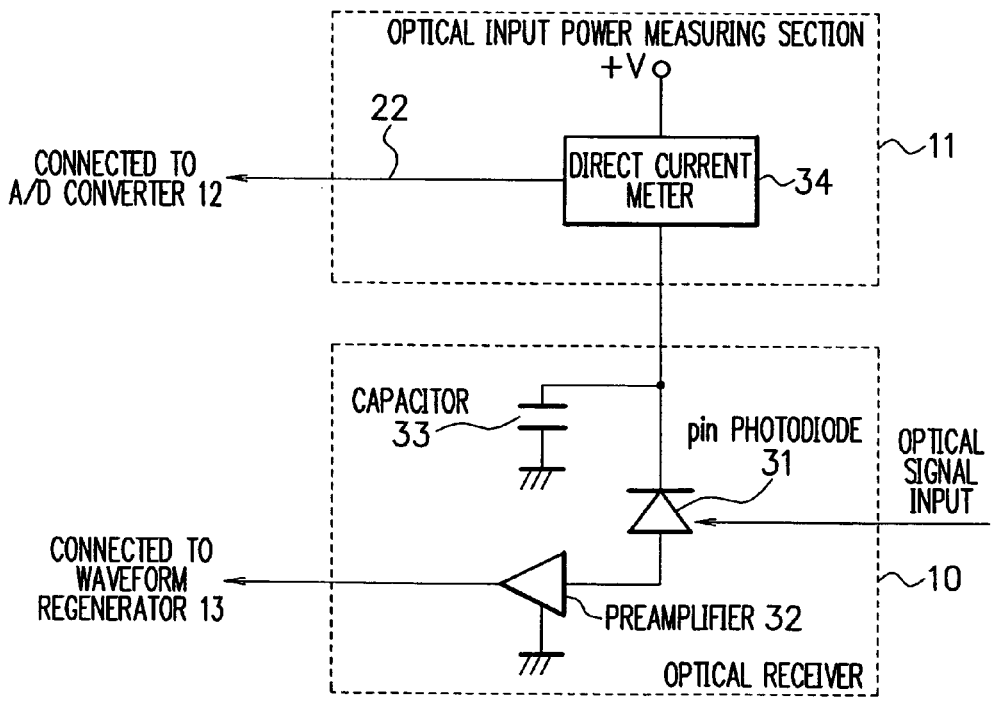
FIG. 5 is a block diagram showing the construction of an optical receiver and an optical input power measuring section of the transmitter-receiver depicted in FIG. 2.

FIG. 5 is a block diagram showing the construction of the optical receiver 10 and the optical input power measuring section 11. Referring to FIG. 5, the optical receiver 10 includes a pin photodiode 31 for converting an input optical signal to an electrical signal, a preamplifier 32 for amplifying the electrical signal from the pin photodiode 31, and a capacitor 33 for dropping the voltage at an n electrode of the pin photodiode 31 to ground or earth potential in the same manner as an alternate current (AC) equivalent circuit. In this embodiment, the maximum permissible input power of the pin photodiode 31 is +1 dBm (average power). In other words, if the average optical input power exceeds +1 dBm, the excessive input power will damage the pin photodiode 31. The optical input power measuring section 11 includes a direct current meter 34. The direct current meter 34 is connected to the pin photodiode 31 in the optical receiver 10, and measures the direct current component of photocurrent or photoelectric current, that is, the average photocurrent that flows through the pin photodiode 31. The direct current meter 34 sends the A/D converter 12 a measured value as an analog signal.

Figure 6:
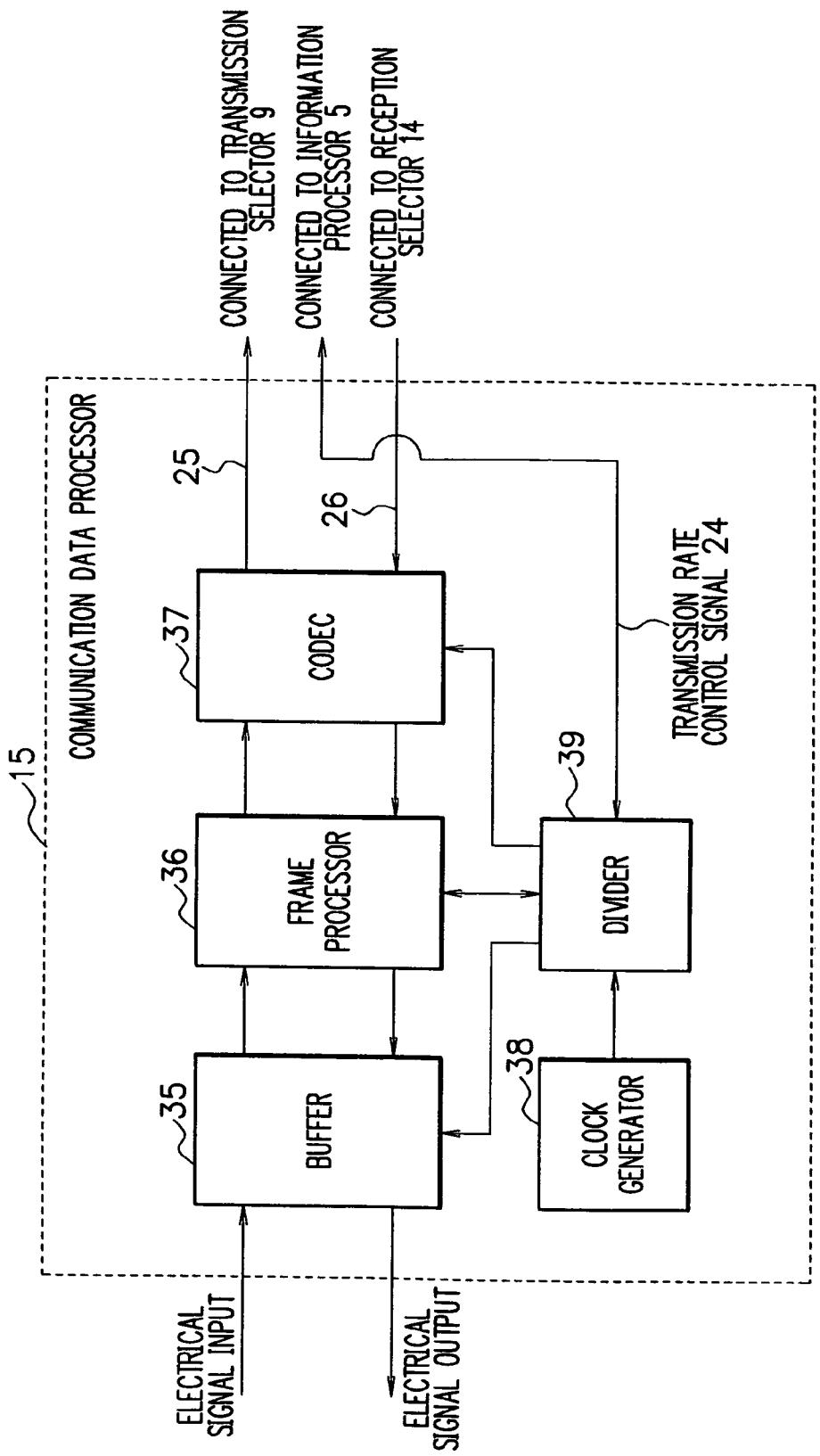
FIG. 6 is a block diagram showing the construction of a communication data processor of the transmitter-receiver depicted in FIG. 2.

FIG. 6 is a block diagram showing the construction of the communication data processor 15. As shown in FIG. 6, the communication data processor 15 includes a buffer 35, a frame processor 36, a coder-decoder (CODEC) 37, a clock generator 38, and a divider 39.

The buffer 35 temporarily stores input data in a frame form (hereinafter referred to as frame data) in a buffer memory. The frame processor 36 detects the code error of input frame data. The CODEC 37 encodes frame data to a code suitable for optical transmission and reception, and also decodes a received data code to restore the code to its original form, frame data. The clock generator 38 generates a clock signal to be a reference for the signal processing rate. The divider 39 divides the clock signal from the clock generator 38 at a designated dividing rate to produce a divided clock signal for each component part. The transmission rate of data is determined based on the divided clock signal.

In the following, a description will be made of the operation of the optical transmitter-receiver according to the first embodiment of the present invention. The optical transmitter-receivers 1 and 2 in FIG. 2 operate in the same manner and thus the operation of one of them will be mainly described.

Figures 8, 9:
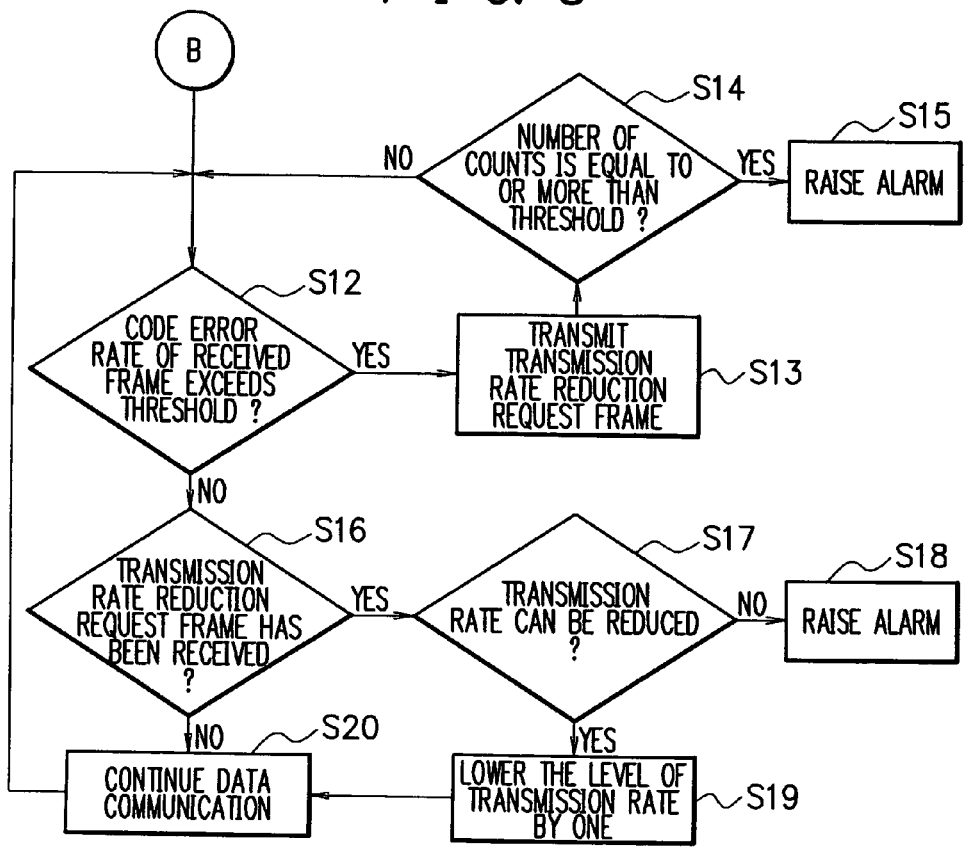
FIG. 8 is a flowchart showing the operation of the transmitter-receiver depicted in FIG. 2.
FIG. 9 is a table for explaining the operation of the transmitter-receiver depicted in FIG. 2.

FIGS. 7 and 8 are flowcharts showing the operation of the optical transmitter-receiver of the first embodiment. First, the outlines of the entire operation will be given. FIG. 7 is a flowchart showing procedural steps from the application of power to the start of data transmission and reception. Once power is applied to the optical transmitter-receiver (step S1), the optical transmitter-receiver determines the optimum optical output intensity and transmission rate for data communication, and starts transmitting and receiving data. Or, when having determined that data communication is impossible, the optical transmitter-receiver raises an alarm (steps S2 to S10). In the operation so far, codes that are communicated between the optical transmitter-receivers are specific codes generated by the information processor 5 shown in FIG. 3, and a string of bits are added to each code to indicate the type of the code. Accordingly, the optical transmitter-receiver can distinguish the specific codes from ordinary data.

Besides, after the optimum optical output intensity and transmission rate for data communication have been determined, the communication data processor 15 shown in FIG. 3 plays the leading role in the transmission and reception of data. FIG. 8 is a diagram showing procedural steps after the start of data transmission and reception to maintain communication by reducing the transmission rate in the case where the communication data processor 15 detects a rise in code error rate caused by some reason.

Next, individual steps S1 to S11 in FIG. 7 and steps S12 to S20 in FIG. 8 will be more fully described.

When power is applied to the optical transmitter-receiver, the information processor 5 detects the application of power (step S1). Subsequently, optical output power (average power) is set to the initial value 0 dBM: P0=0 dBM (step S2). More specifically, the information processor 5 sends the optical output power controller 7 a signal that specifies 0 dBM as the average optical output power via the D/A converter 6.

In the following, a description will be made of effects achieved by setting the initial value of optical output power P0 to 0 dBM (P0=0 dBM) at step S2. As can be seen in FIG. 2, in accordance with the first embodiment of the present invention, the optical transmitter-receivers 1 and 2 are connected via optical fibers 3 and 4 with each other. The optical transmitter-receivers 1 and 2 have not yet obtained information as to the losses of the optical fibers 3 and 4 between them at the time the power is turned on. In this condition, if the optical output power is set to, for example, +6 dBm, the optical power input to the optical receiver 10 exceeds the maximum permissible input power +1 dBm when the distance between the optical transmitter-receivers 1 and 2 is short and the losses of the optical fibers 3 and 4 are small. Thus, the excessive input power damages the pin photodiode 31. On the other hand, if the optical output power is set to 0 dBm as in this embodiment, the optical power input to the optical receiver 10 does not exceed the maximum permissible input power even when the losses of the optical fibers 3 and 4 are 0 (zero). Thereby, it is possible to prevent the pin photodiode 31 from being damaged.

The description has been given of the case where the initial value of optical output power P0 is 0 dBM and the maximum permissible input power of the photodiode is +1 dBm. However, the values are cited merely by way of example and without limitation. In general, the same effects as described above can be achieved when the initial value of optical output power does not exceeds the maximum permissible input power of the photodiode at the receiving end.

After setting optical output power to the initial value (step S2), the optical transmitter-receiver sends an optical output power code, which will be described later, to the other optical transmitter-receiver at an average optical output power of 0 dBM and a transmission rate of 156 Mbps (B0=156 Mbps) (step S3). To be specific, as shown in FIG. 3, the optical transmitter 8 outputs the optical output power code 16 generated by the information processor 5 as an optical signal under the control of the optical output power controller 7 such that the average optical output power is to be 0 dBM. It is assumed that, at this point, the transmission selector 9 is in the state to select a signal from the information processor 5 to send the signal to the optical transmitter 8 based on a select instruction 17 from the information processor 5.

Incidentally, the optical output power code is a code for informing the other optical transmitter-receiver of a value to which the average optical output power is currently set. FIG. 9 is a table showing four 4-bit codes corresponding to four values of the average optical output power, respectively. Of four bits, two bits represents "1" and the other two bits represents "0" in every 4-bit code. The appearance ratio of bits representing "1" of all the four bits, that is, the mark ratio is 0.5.

Figure 10:
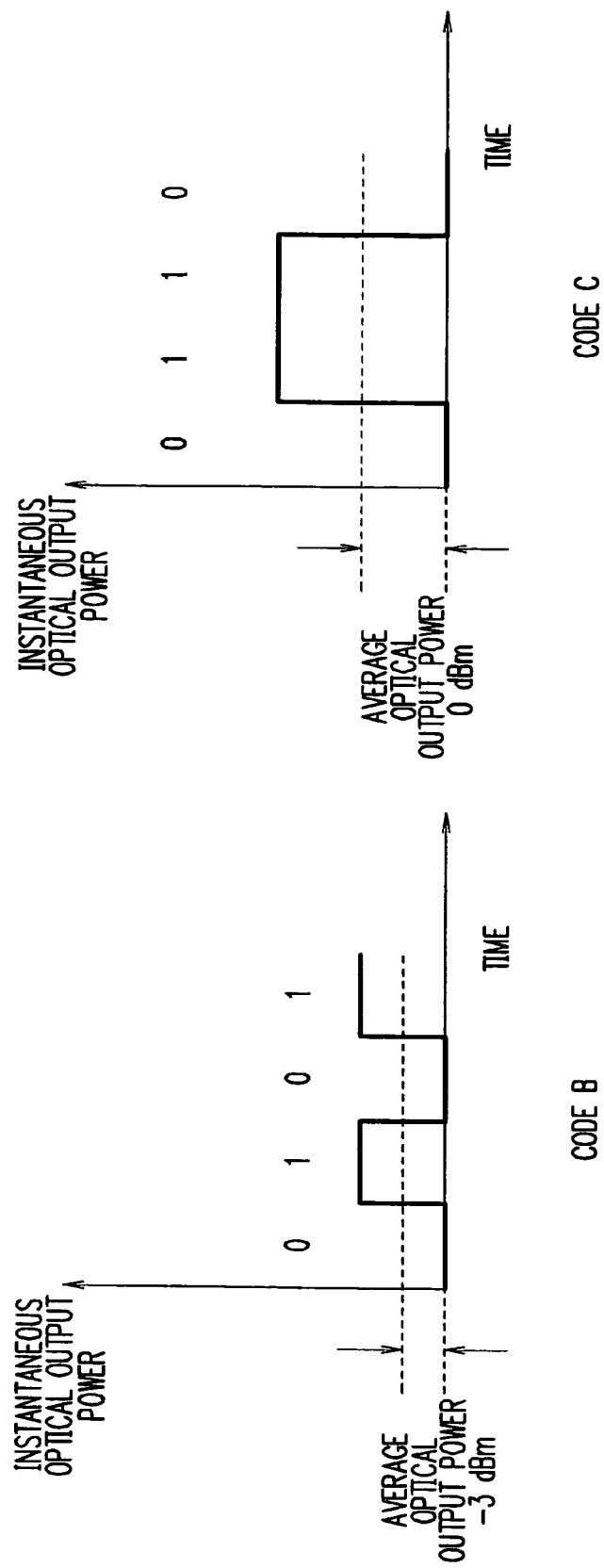
FIG. 10 is a diagram for explaining the operation of the transmitter-receiver depicted in FIG. 2.

FIG. 10 shows an example of the waveform of respective codes B and C. The codes B and C are non-return to zero (NRZ) codes in which instantaneous optical output power remains high during the "1" bit period. The average optical output power is the time-averaged power of instantaneous optical output power. In FIG. 10, the average optical output power for the code B is −3 dBm, while that for the code C is 0 dBm. In this embodiment, the average optical output power to send the optical output power code is set to 0 dBm, and therefore the code C is employed as the optical output power code.

Although not shown in the drawings, the optical output power code includes, in addition to the 4-bit code corresponding to the average optical output power, a string of bits indicating the head of the code, a string of bits indicating that the code is the optical output power code, and a string of bits for detecting a code error. That is, the NRZ code is composed of the 4-bit code and all the strings of bits. Besides, considerations are taken so that the mark ratio is to be 0.5 with respect to the code as a whole.

Figure 11:
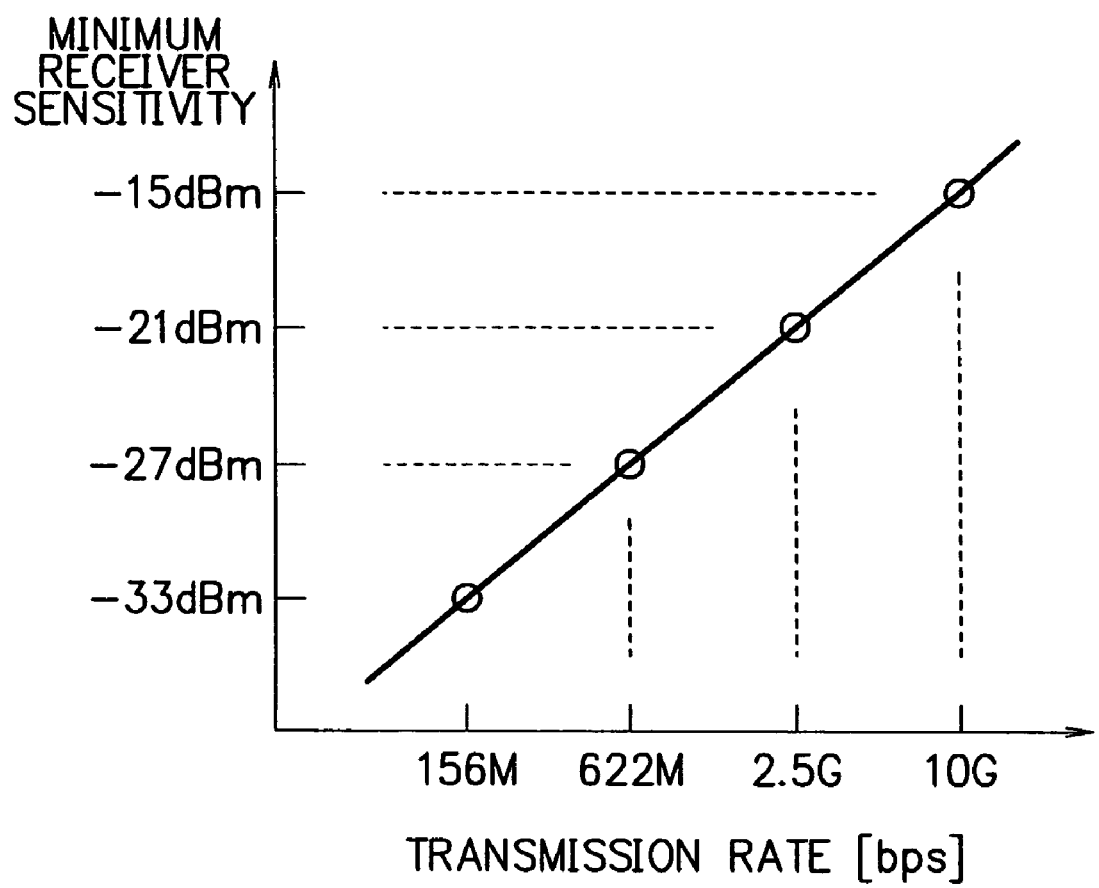
FIG. 11 is a chart for explaining the operation of the transmitter-receiver depicted in FIG. 2.

In the following, a description will be made of effects achieved by transmitting the optical output power code at an average optical output power P0 of 0 dBM and a transmission rate B0 of 156 Mbps at step S3. It is generally known that, in the case of receiving a digital optical signal, the minimum optical input power required to reduce the code error rate to a certain threshold or less (the minimum receiver sensitivity) becomes lower as the transmission rate decreases. That is, the both are approximately in a proportionality relation. In other words, when reception power is constant, the code error rate becomes lower as the transmission rate decreases. FIG. 11 is a chart showing the relation between the minimum receiver sensitivity and the transmission rate when the threshold of the code error rate is $10^{-12}$. In this case, B0=156 Mbps, and the minimum receiver sensitivity is −33 dBm. Besides, P0=0 dBm. Consequently, if it is not possible to receive a code at the transmission rate B0 and the optical output power P0 with a code error rate equal to or less than the threshold, it means that the loss of the optical fiber is 33 dB or more.

It is now proposed to consider whether or not data can be transmitted and received when the loss of the optical fiber is 33 dB or more. In order to transmit and receive data when the loss of the optical fiber is high, it is required to communicate the data with an optical output power as high as possible, and also at a transmission rate as low as possible as is previously described. In the first embodiment, the lowest transmission rate selectable for data communication is, as described hereinbefore, 622 Mbps. The minimum receiver sensitivity corresponding to the transmission rate, 622 Mbps, is −27 dBm as can be seen in FIG. 11. On the other hand, the highest optical output power selectable for data communication is +3 dBm. Therefore, in order to receive the data with a code error rate equal to or less than the threshold, the loss of the optical fiber must be 30 dB or less (3−(−27)=30). As is described above, since the loss of the optical fiber is 33 dB or more, it can be determined that the data is not to be transmitted and received with a code error rate equal to or less than the threshold.

That is, the effects achieved at step S3 are that when the optical output power code cannot be read, it is possible to determine that data transmission and reception is also impossible immediately at the point. Accordingly, procedures, such as requesting the other optical transmitter-receiver to increase the optical output power for transmitting the code, become unnecessary. Thus, the entire operation can be simplified.

Further, a description will be presented of a condition for the aforementioned effects achieved at step S3. The effects achieved at step S3 are not what are obtained at the specific transmission rate and the output power cited above. In general, the same effects can be achieved if the following condition is satisfied:

$$E1 \geqq E0 \tag{1}$$

where E1 denotes the rate of code error that occurs when data is transmitted or received at the lowest selectable transmission rate and with the highest selectable output power, and E0 denotes the rate of code error that occurs when the optical output power code is transmitted or received.

The reason will be explained below. The fact that the optical output power code is not to be received with a code error rate equal to or less than the threshold is represented by the following expression:

$$E0 > ES \tag{2}$$

where ES denotes the threshold of the code error rate. If the above Expression (1) is formed, then the following expression should hold according to Expressions (1) and (2):

$$E1 > ES \tag{3}$$

This means that, data cannot be transmitted or received with a code error rate equal to or less than the threshold even at the lowest selectable transmission rate and the highest selectable output power. That is, if the condition of Expression (1) is satisfied, it can be said that "if the optical output power code cannot be received with a code error rate equal to or less than the threshold, data cannot be transmitted or received with a code error rate equal to or less than the threshold even at the lowest selectable transmission rate and the highest selectable output power". Thus, it is proven that the same effects as achieved at step S3 can be obtained.

Still further, a description will be made of another condition for the aforementioned effects achieved at step S3. The same effects as achieved at step S3 can be obtained if the following relation is satisfied:

$$P0 \geqq P1 \times (B0/B1) \tag{4}$$

where B0 and P0 are the transmission rate and the output power for transmitting the optical output power code, respectively, and B1 and P1 are the lowest transmission rate and the highest output power selectable for data communication, respectively. Incidentally, the unit of P0 and P1 is not "dBm", but "mW" or "W".

The reason will be explained below. As is described above, the minimum receiver sensitivity and the transmission rate are approximately in a proportionality relation. Therefore, the following expression should hold:

$$S0 = S1 \times (B0/B1) \tag{5}$$

where S0 and S1 denote the minimum receiver sensitivity corresponding to the transmission rate B0 and B1, respectively. Now, if it is assumed that the optical power is reduced to 1/a due to transmission loss after transmission through the optical fiber, the condition that "the optical output power code cannot be received with a code error rate equal to or less than the threshold" can be expressed as follows:

$$P0/a < S0 \qquad (6)$$

Then, the following expression is obtained on referring to Expressions (5) and (6):

$$P0/a < S1 \times (B0/B1) \qquad (7)$$

Here, if the condition of Expression (4) is satisfied, the following expression should hold according to Expressions (4) and (7):

$$(P1/a) \times (B0/B1) < S1 \times (B0/B1) \qquad (8)$$

then, the following expression holds as well:

$$P1/a < S1 \qquad (9)$$

The Expression (9) represents the fact that the reception power (=P1/a) is lower than the minimum receiver sensitivity S1 and that data is not to be received with a code error rate equal to or less than the threshold. That is, if Expression (4) is formed, it can be said that "if the optical output power code cannot be received with a code error rate equal to or less than the threshold, data cannot be transmitted or received with a code error rate equal to or less than the threshold even at the lowest selectable transmission rate and the highest selectable output power". Thus, it is proven that the same effects as achieved at step S3 can be obtained.

In the following, a description will be made of effects achieved by transmitting the optical output power code at the transmission rate B0 (=156 Mbps) equal to or less than the lowest selectable transmission rate B1 (=622 Mbps) at step S3. Namely, a description will be made of effects when the following expression holds:

$$B0 \leq B1 \qquad (10)$$

First, disadvantages when Expression (10) does not hold will be explained. In the case where Expression (10) does not hold, that is, in the case where:

$$B0 > B1 \qquad (11)$$

then, the following expression holds:

$$B0/B1 > 1 \qquad (12)$$

therefore, in order to select P0 and P1 that satisfy Expression (4), the following relation must be satisfied:

$$P0 > P1 \qquad (13)$$

In this case, as is described previously for the effects obtained at step S2, the output power P0 for transmitting the optical output power code needs to be equal to or less than the maximum permissible input power Pa of the photodiode to prevent it from being damaged. Namely, the following expression must be formed:

$$Pa \geq P0 \qquad (14)$$

Thus, based on Expressions (13) and (14), it is understood that the following expression must be formed:

$$Pa > P1 \qquad (15)$$

It is desirable that the highest optical output power P1 selectable for data communication be as high as possible so that communication is possible even for higher path loss. However, according to Expression (15), the highest optical output power P1 is limited to a value below the maximum permissible input power Pa of the photodiode. In other words, when Expression (10) does not hold, there arises the disadvantage that sufficiently high P1 cannot be selected.

On the other hand, in the case where Expression (10) holds, the following expression holds as well:

$$B0/B1 \leq 1 \qquad (16)$$

therefore, it is possible to select P0 and P1 that satisfy Expression (4) as follows:

$$P0 \leq P1 \qquad (17)$$

Thus, based on Expression (4), it is understood that the smaller the value of B0/B1, the higher the value of P1 that can be selected.

The main points are briefly summarized as follows. By transmitting the optical output power code at the transmission rate B0 equal to or less than the lowest selectable transmission rate B1, that is, when Expression (10) holds, a sufficiently high value can be selected as the highest optical output power P1 selectable for data communication such that communication is possible even for higher path loss.

In the following, operation at steps S4 and S5 will be described.

Having received the optical output power code, which the other optical transmitter-receiver has sent at step S3, the optical transmitter-receiver determines whether or not the optical output power code can be read with a code error rate equal to or less than the threshold (step S4). First, using a string of bits indicating the head of the optical output power code (previously described for step S3), the optical transmitter-receiver obtains synchronization to read the code. Then, using the string of bits for detecting a code error (also previously described for step S3) added to the optical output power code, the optical transmitter-receiver checks whether or not the optical output power code has been read continuously a predetermined number of times without a code error. Thus, operation at step S4 is carried out.

If the optical output power code cannot be read with a code error rate equal to or less than the threshold (step S4, NO), it means that data communication is impossible for the reason mentioned above. Accordingly, the optical transmitter-receiver raises an alarm to indicate the impossibility of communication (step S5).

On the other hand, if the optical output power code can be read with a code error rate equal to or less than the threshold (step S4, YES), operation proceeds to the next step S6.

Incidentally, although not shown in FIG. 7, the optical transmitter-receiver raises an alarm when synchronization to read the code cannot be obtained for some reason, the input of the optical output power code or optical input cannot be confirmed, the optical transmitter-receiver cannot operate normally and the like.

Figure 12:
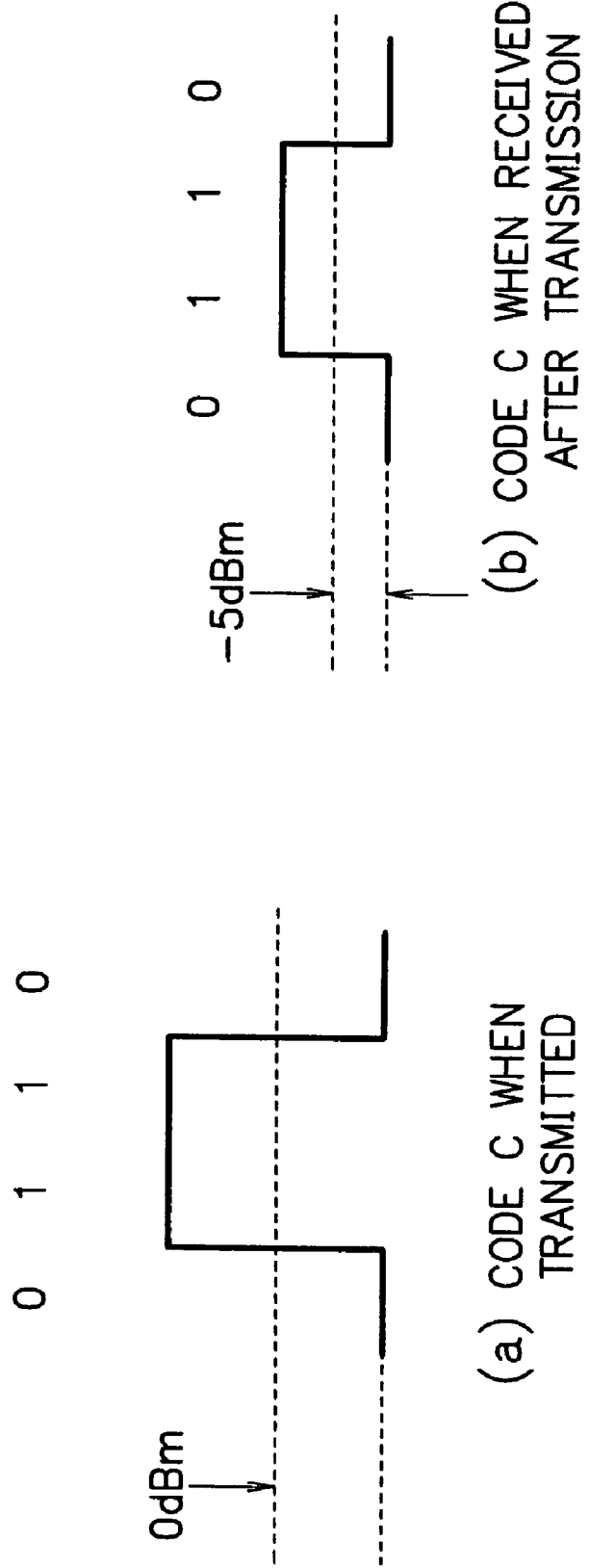
FIG. 12 is a diagram for explaining the operation of the transmitter-receiver depicted in FIG. 2.

In the following, a description will be made of operation at step S6 and effects achieved at step S6 referring to FIG. 12.

As is described above, the transmitter-receiver sends the other transmitter-receiver the code C indicating that the optical output power is 0 dBm with an average optical output power of 0 dBm as shown in FIG. 12(a). When the code C sent from the optical transmitter-receiver arrives at the other transmitter-receiver, its power has been attenuated due to transmission loss in the optical fiber. In this embodiment, the average optical output power is reduced to −5 dBm as shown in FIG. 12(b). When input in the optical receiver 10 of the other transmitter-receiver, the code C undergoes optical/electrical conversion by the pin photodiode 31 as shown in FIG. 4. Subsequently, the direct current meter 34 of the optical input power measuring section 11 measures the direct current component of the photocurrent or the average photocurrent value. On this occasion, as previously described for operation at step S3, the average photocurrent value can be measured stably since considerations are taken so that the mark ratio is constantly 0.5 for the optical output power code.

Next, as can be seen in FIG. 3, the A/D converter 12 converts the optical input power signal 22 output as an analog signal from the optical input power measuring section 11 to a digital signal, and inputs the digital signal to the information processor 5. The information processor 5 obtains information that the average optical output power was −5 dBm at the time of receipt of the code C from an optical input power signal 23. Besides, the pin photodiode 31 outputs the alternate current component of the photocurrent, that is, an electrical signal including information, "0110" of the code C. Then, the preamplifier 32 shown in FIG. 5 increases the amplitude of the electrical signal, and the waveform regenerator 13 shown in FIG. 3 adjusts its waveform. After that, the electrical signal is input to the information processor 5 via the reception selector 14. The information processor 5 obtains information that the average optical output power was 0 dBm at the time of transmission based on the information, "0110" of the code C. Consequently, the information processor 5 obtains information about the average optical output powers on both transmission and reception. Thus, the information processor 5 derives a path loss in the optical fiber from the difference between the both. To be concrete, in this embodiment, the path loss is 5 dB, which is derived from:

0 dB−(−5 dBm)=5 dB

In the following, a description will be made of operation at step S7 and effects achieved at step S7. Each of the optical transmitter-receivers encodes information on the path loss derived at step S6, and transmits a code including the path loss information (hereinafter referred to as a path loss code) to the other transmitter-receiver (step S7). A string of bits indicating that the code represents path loss information is added to the path loss code. Thereby, the respective transmitter-receivers can discriminate the path loss code from the optical output power code transmitted or received at step S3.

Incidentally, at step S6, the optical transmitter-receiver 1 shown in FIG. 2 derives the path loss in the optical fiber 4. On the other hand, the optical transmitter-receiver 1 transmits data through the optical fiber 3, and needs path loss information in the optical fiber 3. The same is true with the optical transmitter-receiver 2. In this embodiment, the optical transmitter-receivers 1 and 2 exchange information about the path loss derived individually at step S7. As a result, both the optical transmitter-receivers 1 and 2 can obtain information necessary for transmission of data.

In the following, operation at steps S8 and S9 will be described. The optical transmitter-receiver determines whether or not the path loss is equal to or less than a specified threshold (step S8). As previously described for the effects achieved at step S3, when the path loss of the optical fiber is 30 dB or less, the optical transmitter-receiver can receive data with a code error rate equal to or less than the threshold. In this embodiment, however, the threshold of path loss is set to 25 dB to allow a margin of 5 dB. Accordingly, when the path loss is 25 dB or less (step S8, NO), operation proceeds to the next step S10. On the other hand, when the path loss exceeds 25 dB (step S8, YES), the optical transmitter-receiver raises an alarm to indicate the excess of the path loss (step S9).

In the following, a description will be made of operation at step S10 and effects achieved at step S10 referring to FIG. 13. FIG. 13 is a chart showing the optimum optical output power and transmission rate with respect to each path loss.

At step S10, the information processor 5 determines the transmission rate and the optical output power for transmitting and receiving data based on the path loss information obtained at step S7. The information processor 5 is provided in advance with information on the optimum optical output power and transmission rate with respect to each path loss as database. Since the path loss is 5 dB in this embodiment, the information processor 5 selects −3 dBm as the optical output power and 10 Gbps as the transmission rate. If the path loss is higher than 5 dB, the information processor 5 increases the optical output power as can be seen in FIG. 13. Nevertheless, if it is not sufficient, the information processor 5 reduces the transmission rate. On the contrary, when the path loss is lower than 5 dB, the information processor 5 decreases the optical output power.

Incidentally, in FIG. 13, each value indicated by a white circle is not included in a range of path loss, while each value indicated by a black circle is included in the range. For example, when the path loss is 19 dB, the information processor 5 selects 3 dBm as the optical output power and 2.5 Gbps as the transmission rate.

After that, the optical transmitter-receiver sends the other transmitter-receiver a code as notice of readiness to transmit and receive data (hereinafter referred to as a communication readiness notice code). The communication readiness notice code may include information as to the optical output power and the transmission rate selected by each transmitter-receiver. Based on the information, when the transmission rates selected by the optical transmitter-receivers differ from one another, the optical transmitter-receivers may employ either of the rates to communicate at the same transmission rate. Additionally, the optical transmitter-receivers may change the optical output power according to the change in the transmission rate. Incidentally, the communication readiness notice code includes a string of bits indicating that the code is the communication readiness notice code as with the optical output power code and the path loss code.

As is described above, first, the optimum optical output power is selected with respect to the path loss at step S10. Therefore, the optical transmitter-receiver does not transmit data with unnecessarily high optical output power, thus consuming lower amounts of electric power. Besides, since the life of a laser diode is extended as optical output power decrease, the life of the laser diode 27 can be prolonged. Moreover, even if it is not sufficient to increase the optical output power, the transmission rate can be reduced in response to higher path loss. In other words, communication is possible even in the case where communication is impossible if the transmission rate is fixed as in conventional techniques.

In the following, operation at step S11 will be described. Each of the optical transmitter-receiver acknowledges the communication readiness notice code from the other transmitter-receiver, and starts transmitting and receiving data at the selected optical output power and transmission rate (step S11). First, the information processor 5 sends the select instruction 17 to the transmission selector 9. Thereby, the transmission selector 9, which has sent each specific code 16 from the information processor 5 to the optical transmitter 8, begins to send data 25 from the communication data processor 15 to the optical transmitter 8. The information processor 5 sends a select instruction 21 also to the reception selector 14. Accordingly, the reception selector 14 reconnects the waveform regenerator 13, which has been connected with the information processor 5 to read each specific code from the other transmitter-receiver, to the communication data processor 15 so as to receive data 26 from the other transmitter-receiver. As shown in FIG. 3, the D/A converter 6 inputs the optical output power specify signal 18 from the information processor 5 to the optical output power controller 7. Thereby, the optical output power of the optical transmitter 8 can be controlled.

In the following, a description will be made of operation to control the transmission rate. First, the information processor 5 outputs the transmission rate control signal 24, and the signal 24 is input to the divider 39 of the communication data processor 15 as shown in FIGS. 3 and 6. The divider 39 divides a clock signal of 10 Gbps generated by the clock generator 38 at a dividing rate of 1/1, 1/4 or 1/16 to produce a clock signal of 10 Gbps, 2.5 Gbps or 622 Mbps, respectively. On this occasion, the divider 39 selects a dividing rate according to the transmission rate control signal 24. In this embodiment, since 10 Gbps is selected as the transmission rate at step S10, the divider 39 selects a dividing rate of 1/1 and feeds each component part with a clock signal of 10 Gbps. Based on the clock signal, the optical transmitter-receiver transmits data at a transmission rate of 10 Gbps.

Besides, as shown in FIG. 6, the buffer 35 temporarily stores data in the buffer memory, and maintains constant surveillance on the remaining capacity of the memory. When the remaining capacity of the buffer memory is reduced to a certain threshold or less, the buffer 35 outputs a frame to request a temporary suspension of transmission. On the other hand, when the remaining capacity of the buffer memory exceeds the threshold, the buffer 35 outputs a frame to request a restart of transmission. Thus, the buffer 35 controls the remaining capacity of the buffer memory.

In this embodiment, electrical signals input to the communication data processor 15 are data propagated through a single electric path, that is, serial data as shown in FIGS. 3 and 6. However, the electrical signals are not necessarily serial data, and may be parallel data that are propagated in parallel through a plurality of electric paths. In the case of parallel data, electrical signal input-output part of the communication data processor 15 is provided with a serial-parallel converter for converting parallel data to serial data to input the data into the buffer 35 and serial data from the buffer 35 to parallel data to output the data.

In the following, operation at steps S12 to S15 will be described. First, the optical transmitter-receiver checks whether or not the code error rate has risen for some reason since the beginning of data communication (step S12). A string of bits for detecting a code error are added to input frame data in advance. The frame processor 36 shown in FIG. 6 detects code errors making use of the bit string. When code errors exceed a specified threshold (step S12, YES), the frame processor 36 outputs a frame to request a reduction of the transmission rate (step S13). In this case, the optical transmitter-receiver counts the number of times that the transmitter-receiver outputs the transmission rate reduction request frame (step S14). If the number of counts is equal to or more than a predefined threshold (step S14, YES), the optical transmitter-receiver determines that "the other optical transmitter-receiver cannot reduce the transmission rate any more", and raises an alarm (step S15).

Next, operation at steps S16 to S20 will be described. The frame processor 36 checks whether or not the transmission rate reduction request frame has been received from the other optical transmitter-receiver (step S16). Having detected the reception of the transmission rate reduction request frame (step S16, YES), the frame processor 36 determines whether or not the transmission rate can be reduced to less than a current setting value (step S17). If the transmission rate has reached the lowest limit, and the transmission rate cannot be reduced any more (step S17, NO), the optical transmitter-receiver raises an alarm (step S18). Or, if the transmission rate can be reduced, the optical transmitter-receiver lowers the level of the transmission rate by one (step S19), and continues the transmission and reception of data (step S20).

In the following, a description will be made of effects achieved at steps S12 to S20. In the case where the code error rate has risen for some reason since the beginning of data communication, conventional transmitter-receivers cannot handle the situation and are disabled for communication because the transmission rate is fixed. In accordance with the present invention, however, when the code error rate has risen, the transmitter-receiver can request the other transmitter-receiver to lower the transmission rate, or lower the transmission rate at the request of the other transmitter-receiver. Thus, it is possible to maintain communication.

While, there are cited four levels of selectable optical output power in the first embodiment described above, there may be less or more levels of selectable optical output power. Besides, the optical output power may be made continuously variable instead of being adjusted step-by-step.

Additionally, while there are cited three levels of selectable transmission rate in the first embodiment, there may be less or more levels of selectable transmission rate. Besides, the transmission rate may be made continuously variable instead of being adjusted step by step.

Further, while the optical transmitter-receiver transmits one type of the optical output power code in the first embodiment, the optical transmitter-receiver may transmit plural types of optical output power codes corresponding to the plural levels of optical output power. In this case, the ultimate path loss may be determined by statistically processing path losses derived based on the plural types of optical output power codes, respectively.

Still further, in the first embodiment, the NRZ code is employed as the optical output power code. However, the NRZ code is cited merely by way of example and without limitation. An RZ (Return to Zero) code or other codes may also be employed.

Still further, in the first embodiment, the information processor 5 sends the select instructions 17 and 21 to the transmission selector 9 and the reception selector 14, respectively, so as to switch between data and the specific codes. However, data and the specific codes may be separated one from the other by a combination of a low-pass filter and a high-pass filter. Since data are transmitted at higher bit rates as compared to the specific codes, data and the specific codes can be separated by providing specific code input-output part of the information processor 5 with a low-pass filter and input-output part of the communication data processor 15 with a high-pass filter.

Still further, the above description of the first embodiment has been made of the case where the loss of optical fiber is calculated. However, when there is gain in a path, that is, when an optical amplifier is placed in a path or the like, the present invention is also applicable as in the above case given that the code of path loss is inverted.

In the following, the second embodiment of the present invention will be described. FIG. 14 is a block diagram showing the construction of an optical transmitter and an optical output power controller of a transmitter-receiver according to the second embodiment of the present invention. FIG. 14 corresponds to FIG. 4 showing the construction of the optical transmitter 8 and the optical output power controller 7 according to the first embodiment. The transmitter-receiver of the second embodiment has essentially the same construction as that of the first embodiment except for the optical transmitter and the optical output power controller. Referring to FIG. 14, the optical transmitter and the optical output power controller of the second embodiment includes a direct modulation laser diode 40 for outputting optical signals by direct modulation, a laser diode driver 41 for controlling the electric current that flows through the direct modulation laser diode 40 to perform direct modulation, an amplitude modulation controller 42 connected to the laser diode driver 41 for controlling the amplitude of a signal on the occasion of amplitude modulation, and a bias point controller 43 for controlling the direct current bias point.

Next, a description will be made of the operation of the optical transmitter-receiver according to the second embodiment of the present invention. According to the second embodiment, optical signals are output by increasing or decreasing the electric current that flows through the direct modulation laser diode 40 without using the optical modulator 28 used in the first embodiment. FIG. 15 is a diagram showing the current-optical output characteristic of the direct modulation laser diode 40, and the relation between the electric current supplied from the laser diode driver 41 to the direct modulation laser diode 40 and optical signal output. As with a general laser diode, the direct modulation laser diode 40 has a current-optical output characteristic such that the optical output increases as the electric current becomes higher after the current exceeds a certain threshold. Therefore, in order to have the direct modulation laser diode 40 output an optical signal, it is necessary that a bias point is set as shown in FIG. 15, and an electrical signal is given to the laser diode 40 based on the bias point. In FIG. 14, the optical output power specify signal 19 from the D/A converter 6 is input to the amplitude modulation controller 42 and the bias point controller 43, and its modulation amplitude and bias point are controlled so that desired optical output power can be obtained. More specifically, the modulation amplitude and bias point are always adjusted so that a value obtained by subtracting the half value of modulation amplitude from a current value at the bias point is about equal to the threshold. Besides, the amplitude modulation controller 42 adjusts the amplitude of transmit data input from the transmission selector 9, and the laser diode driver 41 increases or decreases the current value of the direct modulation laser diode 40. Thereby, an optical signal is output. Otherwise, the optical transmitter-receiver of the second embodiment operates in the same manner as that of the first embodiment.

As is described previously in connection with FIG. 4, the optical transmitter-receiver of the first embodiment is provided with the optical modulator 28. However, the optical modulator is generally expensive, which drives up the cost of manufacturing the optical transmitter-receiver. In accordance with the second embodiment, the direct modulation laser diode 40 is utilized instead of the optical modulator 28. Thus, it is possible to hold down the production cost of the optical transmitter-receiver.

In the following, the third embodiment of the present invention will be described. FIG. 16 is a block diagram showing the construction of a transmitter-receiver according to the third embodiment of the present invention. FIG. 16 corresponds to FIG. 3 showing the construction of the transmitter-receiver according to the first embodiment. In the third embodiment, the transmitter-receiver includes a communication data time division multiplex (TDM) separator 44 as a substitute for the communication data processor 15 in the first embodiment. The transmitter-receiver of the third embodiment has essentially the same construction as that of the first embodiment except for the communication data TDM separator 44. As can be seen in FIG. 16, the communication data TDM separator 44 is provided with first to tenth input-output (I/O) ports 45-1 to 45-10. FIG. 17 is a block diagram showing the internal construction of the communication data TDM separator 44. As shown in FIG. 17, the communication data TDM separator 44 includes a time division multiplex (TDM) processor 47, a frame processor 48, a coder-decoder (CODEC) 49, and buffers 50-1 to 50-10. The first to tenth I/O ports 45-1 to 45-10 are connected to the TDM processor 47 via the buffers 50-1 to 50-10. The TDM processor 47 is connected via the frame processor 48 and CODEC 49 to the transmission selector 9 and reception selector 14, and performs multiplexing, which will be more fully described hereinafter. The buffers 50-1 to 50-10, frame processor 48 and CODEC 49 have the same functions as those of the first embodiment, respectively.

Next, a description will be made of the operation of the optical transmitter-receiver according to the third embodiment of the present invention. In the third embodiment, the TDM processor 47 time-division multiplexes signals from the first to tenth I/O ports 45-1 to 45-10 to produce a serial signal, or in contrary, time-divides a serial signal to output divided signals to the first to tenth I/O ports 45-1 to 45-10. The number of the ports used on this occasion is variable, and determined based on multiplexing number specify signal 46 from the information processor 5. The transmission rate from the TDM processor 47 to the frame processor 48 and the subsequent component parts varies according to the number of multiplexing. The transmission rate is set higher as the number of multiplexing increases, and is set lower as the number of multiplexing decreases. In the first embodiment, the transmission rate is determined according to a transmission rate control signal 24 from the information processor 5. On the other hand, in the third embodiment, the number of multiplexing is determined first, and the transmission rate is determined according to the number of multiplexing. For example, in the case where the number of multiplexing is determined to be 8, eight ports of the first to tenth I/O ports 45-1 to 45-10 are selected in ascending order of remaining memory capacity of the buffers 50-1 to 50-10 corresponding to them, respectively. After that, the ports are interchanged, if required, according to a change in remaining memory capacity of the buffers 50-1 to 50-10. As is the case with the first embodiment, in the respective buffers 50-1 to 50-10 corresponding to the respective first to tenth I/O ports 45-1 to 45-10, when the remaining capacity of the buffer memory is reduced to a certain threshold or less, the buffer outputs a frame to request a temporary suspension of transmission. On the other hand, when the remaining capacity of the buffer memory exceeds the threshold, the buffer outputs a frame to request a restart of transmission.

According to the third embodiment, the communication data TDM separator 44 is provided with a plurality of the I/O ports 45-1 to 45-10 as can be seen in FIG. 17. The TDM processor 47 time-division multiplexes signals from the first to tenth I/O ports 45-1 to 45-10, and produces a serial signal. Thereby, the optical transmitter-receiver can transmit signals as a serial signal to the other optical transmitter-receiver. Thus, transmission can be performed more efficiently as compared to the case where signals are transmitted individually. Moreover, the optimum number of multiplexing is determined according to the size of the path loss, and therefore, transmission can be carried out effectively and sensibly.

Incidentally, while in the first to third embodiments, transmitter-receivers are connected via optical fibers as transmission media, the optical fibers are given merely by way of example and without limitation. The transmitter-receivers may be connected through other transmission media such as electrical cables.

In addition, while in the first to third embodiments, protocols used for data communication are not particularly specified, every protocol used for general data communication, such as Ethernet (R), Fiber Channel, SONET/SDH, protocols similar to them, or original protocols can be used arbitrarily.

Further, while in the first to third embodiments, two transmitter-receivers are connected via paths having no branch, paths may have one or more branches. Furthermore, one transmitter-receiver may be connected with a plurality of transmitter-receivers. In other words, the present invention is applicable to the so-called PON (Passive Optical Network) system and the like.

As set forth hereinabove, in accordance with the present invention, a transmitter-receiver has a function for automatically determining the status of transmission media such as optical fibers and a function for automatically setting and resetting the transmission rate and/or the output power according to the status of transmission media. With this transmitter-receiver, transmission coverage or the scope of application of the transmitter-receiver can be expanded as compared with conventional transmitter-receivers.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A transmission method applied to a system comprising transmission media and a plurality of transmitter-receivers connected via the transmission media, comprising:
    transmitting information on the output power of a first transmitter-receiver from the first transmitter-receiver to a second transmitter-receiver;
    measuring reception strength by the second transmitter-receiver when the second transmitter-receiver receives the output power information;
    reading the output power information by the second transmitter-receiver; and
    comparing the reception strength with the output power information to calculate a transmission loss or gain by the second transmitter-receiver,
    wherein at least one of the transmission rate and the output power of the first transmitter/receiver are automatically adjusted according to the calculation of transmission loss or gain by the second transmitter-receiver,
    wherein the output power for transmitting the output power information is expressed as follows:

$P0 \geq P1 \times (B0/B1)$ where B0 and P0 are the transmission rate and the output power for transmitting the output power information, respectively, and B1 and P1 are the lowest transmission rate and the highest output power selectable for data communication, respectively.

2. The transmission method claimed in claim 1, wherein the transmission method is an optical transmission method.

3. The transmission method claimed in claim 1, wherein, during measuring reception strength, the average photocurrent that flows through a light receiving element for receiving the output power information is also measured.

4. The transmission method claimed in claim 1, wherein:
    the transmission method is an optical transmission method; and
    during measuring reception strength, the average photocurrent that flows through a light receiving element for receiving the output power information is also measured.

5. The transmission method claimed in claim 1, wherein the output power information is represented by a digital code.

6. The transmission method claimed in claim 1, wherein:
    the transmission method is an optical transmission method;
    and
    the output power information is represented by a digital code.

7. The transmission method claimed in claim 1, wherein:
    during measuring reception strength, the average photocurrent that flows through a light receiving element for receiving the output power information is also measured; and
    the output power information is represented by a digital code.

8. The transmission method claimed in claim 1, wherein:
    the transmission method is an optical transmission method;
    during measuring reception strength, the average photocurrent that flows through a light receiving element for receiving the output power information is also measured; and
    the output power information is represented by a digital code.

9. The transmission method claimed in claim 1, wherein:
    the output power information is represented by a digital code; and
    the digital code is a binary code having a constant mark ratio.

10. The transmission method claimed in claim 1, wherein:
    the transmission method is an optical transmission method;
    the output power information is represented by a digital code; and
    the digital code is a binary code having a constant mark ratio.

11. The transmission method claimed in claim 1, wherein:
    during measuring reception strength, the average photocurrent that flows through a light receiving element for receiving the output power information is also measured;
    the output power information is represented by a digital code; and
    the digital code is a binary code having a constant mark ratio.

12. The transmission method claimed in claim 1, wherein:
    the transmission method is an optical transmission method;
    during measuring reception strength, the average photocurrent that flows through a light receiving element for receiving the output power information is also measured;
    the output power information is represented by a digital code; and
    the digital code is a binary code having a constant mark ratio.

13. The transmission method claimed in claim 1, wherein:
    the output power information is represented by a digital code; and
    a string of bits indicating the head of the digital code is added to the beginning of the digital code.

14. The transmission method claimed in claim 1, wherein:
the transmission method is an optical transmission method;
the output power information is represented by a digital code; and
a string of bits indicating the head of the digital code is added to the beginning of the digital code.

15. The transmission method claimed in claim 1, wherein:
during measuring reception strength, the average photocurrent that flows through a light receiving element for receiving the output power information is also measured;
the output power information is represented by a digital code; and
a string of bits indicating the head of the digital code is added to the beginning of the digital code.

16. The transmission method claimed in claim 1, wherein:
the transmission method is an optical transmission method;
during measuring reception strength, the average photocurrent that flows through a light receiving element for receiving the output power information is also measured;
the output power information is represented by a digital code; and
a string of bits indicating the head of the digital code is added to the beginning of the digital code.

17. The transmission method claimed in claim 1, wherein:
the output power information is represented by a digital code;
the digital code is a binary code having a constant mark ratio; and
a string of bits indicating the head of the digital code is added to the beginning of the digital code.

18. The transmission method claimed in claim 1, wherein:
the transmission method is an optical transmission method;
the output power information is represented by a digital code;
the digital code is a binary code having a constant mark ratio; and
a string of bits indicating the head of the digital code is added to the beginning of the digital code.

19. The transmission method claimed in claim 1, wherein:
during measuring reception strength, the average photocurrent that flows through a light receiving element for receiving the output power information is also measured;
the output power information is represented by a digital code;
the digital code is a binary code having a constant mark ratio; and
a string of bits indicating the head of the digital code is added to the beginning of the digital code.

20. The transmission method claimed in claim 1, wherein:
the transmission method is an optical transmission method;
during measuring reception strength, the average photocurrent that flows through a light receiving element for receiving the output power information is also measured;
the output power information is represented by a digital code;
the digital code is a binary code having a constant mark ratio; and
a string of bits indicating the head of the digital code is added to the beginning of the digital code.

21. The transmission method claimed in claim 1, wherein:
the output power information is represented by a digital code; and
at least one of a string of bits indicating that the digital code represents the output power information and a string of bits for detecting a code error is added to the digital code.

22. The transmission method claimed in claim 1, wherein:
the transmission method is an optical transmission method;
the output power information is represented by a digital code; and
at least one of a string of bits indicating that the digital code represents the output power information and a string of bits for detecting a code error is added to the digital code.

23. The transmission method claimed in claim 1, wherein:
during measuring reception strength, the average photocurrent that flows through a light receiving element for receiving the output power information is also measured;
the output power information is represented by a digital code; and
at least one of a string of bits indicating that the digital code represents the output power information and a string of bits for detecting a code error is added to the digital code.

24. The transmission method claimed in claim 1, wherein:
the transmission method is an optical transmission method;
during measuring reception strength, the average photocurrent that flows through a light receiving element for receiving the output power information is also measured;
the output power information is represented by a digital code; and
at least one of a string of bits indicating that the digital code represents the output power information and a string of bits for detecting a code error is added to the digital code.

25. The transmission method claimed in claim 1, wherein:
the output power information is represented by a digital code;
the digital code is a binary code having a constant mark ratio; and
at least one of a string of bits indicating that the digital code represents the output power information and a string of bits for detecting a code error is added to the digital code.

26. The transmission method claimed in claim 1, wherein:
the transmission method is an optical transmission method;
the output power information is represented by a digital code;
the digital code is a binary code having a constant mark ratio; and
at least one of a string of bits indicating that the digital code represents the output power information and a string of bits for detecting a code error is added to the digital code.

27. The transmission method claimed in claim 1, wherein:
during measuring reception strength, the average photocurrent that flows through a light receiving element for receiving the output power information is also measured;
the output power information is represented by a digital code;
the digital code is a binary code having a constant mark ratio; and
at least one of a string of bits indicating that the digital code represents the output power information and a string of bits for detecting a code error is added to the digital code.

28. The transmission method claimed in claim 1, wherein:
the transmission method is an optical transmission method;
during measuring reception strength, the average photocurrent that flows through a light receiving element for receiving the output power information is also measured;

the output power information is represented by a digital code;

the digital code is a binary code having a constant mark ratio; and at least one of a string of bits indicating that the digital code represents the output power information and a string of bits for detecting a code error is added to the digital code.

29. The transmission method claimed in claim 1, wherein:

the output power information is represented by a digital code;

a string of bits indicating the head of the digital code is added to the beginning of the digital code; and at least one of a string of bits indicating that the digital code represents the output power information and a string of bits for detecting a code error is added to the digital code.

30. The transmission method claimed in claim 1, wherein:

the transmission method is an optical transmission method;

the output power information is represented by a digital code;

a string of bits indicating the head of the digital code is added to the beginning of the digital code; and at least one of a string of bits indicating that the digital code represents the output power information and a string of bits for detecting a code error is added to the digital code.

31. The transmission method claimed in claim 1, wherein:

during measuring reception strength, the average photocurrent that flows through a light receiving element for receiving the output power information is also measured;

the output power information is represented by a digital code;

a string of bits indicating the head of the digital code is added to the beginning of the digital code; and at least one of a string of bits indicating that the digital code represents the output power information and a string of bits for detecting a code error is added to the digital code.

32. The transmission method claimed in claim 1, wherein:

the transmission method is an optical transmission method;

during measuring reception strength, the average photocurrent that flows through a light receiving element for receiving the output power information is also measured;

the output power information is represented by a digital code;

a string of bits indicating the head of the digital code is added to the beginning of the digital code; and at least one of a string of bits indicating that the digital code represents the output power information and a string of bits for detecting a code error is added to the digital code.

33. The transmission method claimed in claim 1, wherein:

the output power information is represented by a digital code;

the digital code is a binary code having a constant mark ratio;

a string of bits indicating the head of the digital code is added to the beginning of the digital code; and at least one of a string of bits indicating that the digital code represents the output power information and a string of bits for detecting a code error is added to the digital code.

34. The transmission method claimed in claim 1, wherein:

the transmission method is an optical transmission method;

the output power information is represented by a digital code;

the digital code is a binary code having a constant mark ratio;

a string of bits indicating the head of the digital code is added to the beginning of the digital code; and at least one of a string of bits indicating that the digital code represents the output power information and a string of bits for detecting a code error is added to the digital code.

35. The transmission method claimed in claim 1, wherein:

during measuring reception strength, the average photocurrent that flows through a light receiving element for receiving the output power information is also measured;

the output power information is represented by a digital code;

the digital code is a binary code having a constant mark ratio;

a string of bits indicating the head of the digital code is added to the beginning of the digital code; and at least one of a string of bits indicating that the digital code represents the output power information and a string of bits for detecting a code error is added to the digital code.

36. The transmission method claimed in claim 1, wherein:

the transmission method is an optical transmission method;

during measuring reception strength, the average photocurrent that flows through a light receiving element for receiving the output power information is also measured;

the output power information is represented by a digital code;

the digital code is a binary code having a constant mark ratio;

a string of bits indicating the head of the digital code is added to the beginning of the digital code; and at least one of a string of bits indicating that the digital code represents the output power information and a string of bits for detecting a code error is added to the digital code.

37. The transmission method claimed in claim 1, wherein:

the output power information includes different types of information on output power; and during calculating a transmission loss or gain, the transmission loss or gain is calculated by statistically processing transmission losses or gains calculated based on the different types of output power information, respectively.

38. The transmission method claimed in claim 1, wherein:

the transmission method is an optical transmission method;

the output power information includes different types of information on output power; and during calculating a transmission loss or gain, the transmission loss or gain is calculated by statistically processing transmission losses or gains calculated based on the different types of output power information, respectively.

39. The transmission method claimed in claim 1, wherein:

during measuring reception strength, the average photocurrent that flows through a light receiving element for receiving the output power information is also measured;

the output power information includes different types of information on output power; and during calculating a transmission loss or gain, the transmission loss or gain is calculated by statistically processing transmission losses or gains calculated based on the different types of output power information, respectively.

40. The transmission method claimed in claim 1, wherein:

the output power information is represented by a digital code;

the output power information includes different types of information on output power; and during calculating a transmission loss or gain, the transmission loss or gain is calculated by statistically processing transmission losses or gains calculated based on the different types of output power information, respectively.

41. The transmission method claimed in claim 1, wherein:
the output power information is represented by a digital code;
the digital code is a binary code having a constant mark ratio;
the output power information includes different types of information on output power; and
during calculating a transmission loss or gain, the transmission loss or gain is calculated by statistically processing transmission losses or gains calculated based on the different types of output power information, respectively.

42. The transmission method claimed in claim 1, wherein:
the output power information is represented by a digital code;
a string of bits indicating the head of the digital code is added to the beginning of the digital code;
the output power information includes different types of information on output power; and
during calculating a transmission loss or gain, the transmission loss or gain is calculated by statistically processing transmission losses or gains calculated based on the different types of output power information, respectively.

43. The transmission method claimed in claim 1, wherein:
the output power information is represented by a digital code;
at least one of a string of bits indicating that the digital code represents the output power information and a string of bits for detecting a code error is added to the digital code;
the output power information includes different types of information on output power; and
during calculating a transmission loss or gain, the transmission loss or gain is calculated by statistically processing transmission losses or gains calculated based on the different types of output power information, respectively.

44. A transmitter-receiver performing the transmission method claimed in one of claims 1 to 43, comprising:
a first measuring unit for measuring the transmission loss or gain of the transmission media;
a resetting unit for changing at least one of the transmission rate and the output power according to a measurement result obtained by the first measuring unit;
an informing unit for sending another transmitter-receiver information on its own output power;
a second measuring unit for measuring reception strength on receipt of output power information from another transmitter-receiver;
a reading unit for reading the output power information; and
a third measuring unit for measuring a transmission loss or gain based on the reception strength and the output power information.

45. A transmitter-receiver connected via transmission media with at least one transmitter-receiver for transmitting and receiving data, comprising:
a first measuring unit for measuring the transmission loss or gain of the transmission media;
a resetting unit for changing at least one of the transmission rate and the output power according to a measurement result obtained by the first measuring unit;
an informing unit for sending another transmitter-receiver information on its own output power;
a second measuring unit for measuring reception strength on receipt of output power information from another transmitter-receiver;
a reading unit for reading the output power information; and
a third measuring unit for measuring a transmission loss or gain based on the reception strength and the output power information,
wherein a code error rate obtained from the transmission rate and the output power for transmitting the output power information is set to be equal to or lower than a code error rate obtained when a signal is transmitted or received at the lowest transmission rate and with the highest output power selectable for data communication.

46. The transmitter-receiver claimed in claim 45, wherein the transmission media are optical transmission media through which the light is transmitted.

47. The transmitter-receiver claimed in claim 45 further comprising an output power controlling unit for controlling output power for transmitting the output power information so that the output power is not to exceed the maximum permissible input power of another transmitter-receiver at the receiving end.

48. The transmitter-receiver claimed in claim 45 further comprising an output power controlling unit for controlling output power for transmitting the output power information so that the output power is not to exceed the maximum permissible input power of another transmitter-receiver at the receiving end, wherein the output power for transmitting the output power information is expressed as follows:

$$P0 \geq P1 \times (B0/B1)$$

where B0 and P0 are the transmission rate and the output power for transmitting the output power information, respectively, and B1 and P1 are the lowest transmission rate and the highest output power selectable for data communication, respectively.

49. The transmitter-receiver claimed in claim 45, wherein:
the output power for transmitting the output power information is expressed as follows:

$$P0 \geq P1 \times (B0/B1)$$

where B0 and P0 are the transmission rate and the output power for transmitting the output power information, respectively, and B1 and P1 are the lowest transmission rate and the highest output power selectable for data communication, respectively.

50. The transmitter-receiver claimed in claim 45, wherein:
the transmitter-receiver further comprises an output power controlling unit for controlling output power for transmitting the output power information so that the output power is not to exceed the maximum permissible input power of another transmitter-receiver at the receiving end; and
the output power for transmitting the output power information is expressed as follows:

$$P0 \geq P1 \times (B0/B1)$$

where B0 and P0 are the transmission rate and the output power for transmitting the output power information, respectively, and B1 and P1 are the lowest transmission rate and the highest output power selectable for data communication, respectively.

51. The transmitter-receiver claimed in claim 45, wherein the transmission rate for transmitting the output power information is set to be equal to or lower than the lowest transmission rate selectable for data communication.

52. The transmitter-receiver claimed in claim 45, wherein:
the transmission media are optical transmission media through which the light is transmitted; and
the transmission rate for transmitting the output power information is set to be equal to or lower than the lowest transmission rate selectable for data communication.

53. The transmitter-receiver claimed in claim 45 further comprising an output power controlling unit for controlling output power for transmitting the output power information so that the output power is not to exceed the maximum permissible input power of another transmitter-receiver at the receiving end, wherein the transmission rate for transmitting the output power information is set to be equal to or lower than the lowest transmission rate selectable for data communication.

54. The transmitter-receiver claimed in claim 45, wherein the transmitter-receiver sends information on the transmission loss or gain of the transmission media to another transmitter-receiver at the receiving end after measuring the transmission loss or gain.

55. The transmitter-receiver claimed in claim 45, wherein:
the transmission media are optical transmission media through which the light is transmitted; and
the transmitter-receiver sends information on the transmission loss or gain of the transmission media to another transmitter-receiver at the receiving end after measuring the transmission loss or gain.

56. The transmitter-receiver claimed in claim 45 further comprising an output power controlling unit for controlling output power for transmitting the output power information so that the output power is not to exceed the maximum permissible input power of another transmitter-receiver at the receiving end, wherein the transmitter-receiver sends information on the transmission loss or gain of the transmission media to another transmitter-receiver at the receiving end after measuring the transmission loss or gain.

57. The transmitter-receiver claimed in claim 45, wherein:
the transmission rate for transmitting the output power information is set to be equal to or lower than the lowest transmission rate selectable for data communication; and
the transmitter-receiver sends information on the transmission loss or gain of the transmission media to another transmitter-receiver at the receiving end after measuring the transmission loss or gain.

58. A transmitter-receiver connected via transmission media with at least one transmitter-receiver for transmitting and receiving data, comprising:
a first measuring unit for measuring the transmission loss or gain of the transmission media;
a resetting unit for changing at least one of the transmission rate and the output power according to a measurement result obtained by the first measuring unit;
an informing unit for sending another transmitter-receiver information on its own output power;
a second measuring unit for measuring reception strength on receipt of output power information from another transmitter-receiver;
a reading unit for reading the output power information; and
a third measuring unit for measuring a transmission loss or gain based on the reception strength and the output power information,
wherein the output power for transmitting the output power information is expressed as follows:

$$P0 \geq P1 \times (B0/B1)$$

where B0 and P0 are the transmission rate and the output power for transmitting the output power information, respectively, and B1 and P1 are the lowest transmission rate and the highest output power selectable for data communication, respectively.

59. The transmitter-receiver claimed in claim 58, wherein:
the transmission media are optical transmission media through which the light is transmitted.

60. The transmitter-receiver claimed in claim 58, wherein:
the transmission rate for transmitting the output power information is set to be equal to or lower than the lowest transmission rate selectable for data communication.

61. The transmitter-receiver claimed in claim 58 wherein:
the transmitter-receiver sends information on the transmission loss or gain of the transmission media to another transmitter-receiver at the receiving end after measuring the transmission loss or gain.

62. A transmitting-receiving system comprising transmission media and a plurality of transmitter-receivers connected via the transmission media, wherein the transmitter-receiver comprises:
a transmitter for transmitting signals and information on its own output power to one of the transmission media;
an output power controller for controlling the output power of the transmitter;
a receiver for receiving signals and information on output power via one of the transmission media;
an input power measuring section for measuring the strength of input signals;
a communication data processor for changing the rate of data transmission; and
an information processor for deriving a path loss based on the output power information and the signal strength, and changing the output power of the transmitter and the rate of data transmission according to the derived path loss,
wherein a code error rate obtained from the transmission rate and the output power for transmitting the output power information is set to be equal to or lower than a code error rate obtained when a signal is transmitted or received at the lowest transmission rate and with the highest output power selectable for data communication.

63. The transmitting-receiving system claimed in claim 62, wherein:
the output power for transmitting the output power information is expressed as follows:

$$P0 \geq P1 \times (B0/B1)$$

where B0 and P0 are the transmission rate and the output power for transmitting the output power information, respectively, and B1 and P1 are the lowest transmission rate and the highest output power selectable for data communication, respectively.

64. The transmitting-receiving system claimed in claim 62, wherein:
the output power for transmitting the output power information is expressed as follows:

$$P0 \geq P1 \times (B0/B1)$$

where B0 and P0 are the transmission rate and the output power for transmitting the output power information, respectively, and B1 and P1 are the lowest transmission rate and the highest output power selectable for data communication, respectively; and the transmission rate for transmitting the output power information is set to be equal to or lower than the lowest transmission rate selectable for data communication.

65. The transmitting-receiving system claimed in claim 62, wherein:

the output power for transmitting the output power information is expressed as follows:

$$P0 \geq P1 \times (B0/B1)$$

where $B0$ and $P0$ are the transmission rate and the output power for transmitting the output power information, respectively, and $B1$ and $P1$ are the lowest transmission rate and the highest output power selectable for data communication, respectively;

the transmission rate for transmitting the output power information is set to be equal to or lower than the lowest transmission rate selectable for data communication; and the transmitter-receiver sends information on the transmission loss of the transmission media to another transmitter-receiver at the receiving end after measuring the transmission loss.

* * * * *